US012806706B2

(12) United States Patent
Chen et al.

(10) Patent No.: US 12,806,706 B2
(45) Date of Patent: Nov. 24, 2026

(54) SYSTEMS AND METHODS FOR CONTROLLING CUTTING PATHS OF A THERMAL PROCESSING TORCH

(71) Applicant: Hypertherm, Inc., Hanover, NH (US)

(72) Inventors: Liming Chen, Hanover, NH (US); Stephen M. Liebold, Grantham, NH (US); Austin Davis, Newport, NH (US); Steven Bertken, Lees Summit, MO (US); Rene Darr, Lockport, NY (US); James Anderson, Roseville, MN (US)

(73) Assignee: Hypertherm, Inc., Hanover, NH (US)

( * ) Notice: Subject to any disclaimer, the term of this patent is extended or adjusted under 35 U.S.C. 154(b) by 199 days.

(21) Appl. No.: 17/410,337

(22) Filed: Aug. 24, 2021

(65) Prior Publication Data

US 2022/0055141 A1 Feb. 24, 2022

Related U.S. Application Data

(60) Provisional application No. 63/069,283, filed on Aug. 24, 2020.

(51) Int. Cl.
*B23K 9/12* (2006.01)
*B23K 9/013* (2006.01)
(Continued)

(52) U.S. Cl.
CPC .............. *B23K 9/126* (2013.01); *B23K 9/013* (2013.01); *B23K 37/0252* (2013.01); (Continued)

(58) Field of Classification Search
CPC ........ G05B 19/182; G05B 2219/45041; B23K 26/38; B23K 26/0869; B23K 37/06; B23K 37/0252; B23K 9/013; B23K 9/126
See application file for complete search history.

(56) References Cited

U.S. PATENT DOCUMENTS 2,510,210 A * 6/1950 Bucknam ............... B23K 7/003 148/194
3,674,973 A * 7/1972 Graville ................. B23K 25/00 219/137 R (Continued)

FOREIGN PATENT DOCUMENTS

JP S5533826 A 3/1980

OTHER PUBLICATIONS

Richard et al., “Rimbaud: Software for Automatic Part Positioning and Cutting Optimization,” Alsthom Review, Alsthom, Paris, FR, No. 7, Jan. 1, 1987, pp. 63-70, XP000112000.

(Continued)

*Primary Examiner* — Woody A Lee, Jr.
*Assistant Examiner* — Abigail H Rhue
(74) *Attorney, Agent, or Firm* — Cesari and McKenna, LLP

(57) ABSTRACT

A computerized method is provided for selecting a direction of formation of a slag puddle on a workpiece during processing of the workpiece by a thermal processing torch. The method comprises causing the torch to emit a thermal arc to gouge the workpiece at a first location without piercing through the workpiece. The method also includes translating the torch from the first location to a second location along a first direction on the workpiece while the torch is gouging the workpiece, the first direction substantially along the selected direction of slag puddle formation. The gouging and translating cause formation of a trench in a surface of the workpiece in the first direction. The method further includes causing the thermal arc emitted by the torch to pierce through the workpiece at the second location, which causes the formation of the slag puddle along the selected direction as guided by the trench.

14 Claims, 11 Drawing Sheets

(51) Int. Cl.

| | |
|---|---|
| ***B23K 37/02*** | (2006.01) |
| ***B23K 37/06*** | (2006.01) |
| ***G05B 19/18*** | (2006.01) |
| *B23K 26/08* | (2014.01) |
| *B23K 26/38* | (2014.01) |

(52) U.S. Cl.

CPC ............ *B23K 37/06* (2013.01); *G05B 19/182* (2013.01); *B23K 26/0869* (2013.01); *B23K 26/38* (2013.01); *G05B 2219/45041* (2013.01)

(56) References Cited

U.S. PATENT DOCUMENTS

| | | | | |
|---|---|---|---|---|
| 4,954,683 | A * | 9/1990 | Hatch | H05H 1/341 219/121.48 |
| 6,087,627 | A * | 7/2000 | Kramer | B23K 9/095 219/130.21 |
| 8,338,739 | B2 | 12/2012 | Lindsay et al. | |
| 8,710,395 | B2 | 4/2014 | Lindsay et al. | |
| 10,189,110 | B2 * | 1/2019 | Yamaguchi | B23K 10/006 |
| 11,504,794 | B2 | 11/2022 | Nadler et al. | |
| 2010/0018954 | A1 * | 1/2010 | Hussary | H05H 1/36 219/121.36 |
| 2010/0155376 | A1 | 6/2010 | Lindsay et al. | |
| 2010/0213178 | A1 | 8/2010 | Lindsay et al. | |
| 2020/0156170 | A1 * | 5/2020 | Lindsay | B23K 9/013 |
| 2021/0291290 | A1 | 9/2021 | Peters et al. | |

OTHER PUBLICATIONS

Hypertherm, Inc., "Moving Pierce Technique: HPR400XD and HPR800XD Plasma Cutting Systems," White Paper, 807840—Revision 0—Nov. 2012, 9 pgs.

Hypertherm, Inc., Power Point Presentation, "Successfully Piercing Thick Plate with Plasma, And How Plasma Torch Design Improvements Extend Piercing Capabilities," Steve Liebold, Plasma Process Engineer, Fabtech International & AWS Welding Show, Nov. 16, 2009, 74 pgs.

* cited by examiner

SYSTEMS AND METHODS FOR CONTROLLING CUTTING PATHS OF A THERMAL PROCESSING TORCH

CROSS REFERENCE TO RELATED APPLICATION

This application claims the benefit of and priority to U.S. Provisional Patent Application No. 63/069,283, filed Aug. 24, 2020, the entire contents of which are owned by the assignee of the instant application and incorporated herein by reference in their entirety.

TECHNICAL FIELD

The present invention generally relates to computerized systems and methods for controlling cutting of parts from a workpiece by a thermal processing torch.

BACKGROUND

Material processing systems, such as plasma, laser or liquid jet cutting systems, are widely used in the heating, cutting, gouging and marking of materials. For example, a plasma arc torch generally includes an electrode, a nozzle having a central exit orifice mounted within a torch body, electrical connections, passages for cooling, and passages for arc control fluids (e.g., plasma gas). In operation, the plasma arc torch produces a plasma arc, which is a constricted jet of an ionized gas with high temperature and sufficient momentum to assist with removal of molten metal. A laser cutting system, which generally includes a nozzle, a gas stream, an optical system, and a high-power laser for generating a laser beam, is configured to pass the laser beam and gas stream through the nozzle to impinge upon a workpiece to cut or otherwise modify the workpiece.

Traditionally, when processing (e.g., cutting) a thick workpiece using industrial cutting equipment, a long lead-in length is required prior to actually cutting a part with desired geometry from the workpiece. This long lead-in length gives the plasma arc time to pierce the workpiece, develop, and stabilize, thereby ensuring a consistent arc and quality edge formation on the part, but at the expense of increased scrap production with increased lead-in length on the workpiece, which require parts to be spaced further apart (i.e. less densely located). For example, when cutting a thick workpiece (e.g., about 1 inch or more) using a plasma arc torch, long lead-ins are required to establish and stabilize the plasma arc generated by the torch and provide sufficient space for the pierce as well as any slag puddles to be formed from the piercing such that they do not interfere with the part itself. Further, the longer the lead-ins that are required prior to cutting a part from a workpiece, the more space is needed between parts on the same workpiece to ensure that the lead-ins and pierces do not affect adjacent parts. In general, thicker workpieces require greater lead-in lengths and part spacing, thereby causing diminished workpiece utilization (e.g., less usable workpiece remnants and skeletons) compared to cutting of thinner workpieces.

For thermal processing (e.g., plasma or laser cutting), the typical rule for determining the appropriate lead-in length for cutting a part from a workpiece is that the length should be at least equivalent to the thickness of the workpiece. With existing systems and methods, when nesting/arranging multiple parts to be cut from a workpiece, the lead-in lengths for the parts constitute one of the main factors that determines, impacts, and increases the amount of unused material left in the skeleton of the workpiece. Thus, a shorter lead-in is preferred because more parts can be nested in the workpiece.

Another common issue for thermal processing systems is that following a pierce, the molten material blown out during piercing the workpiece forms a slag puddle on the workpiece, the direction of formation of this slag puddle is typically random which often results in the slag puddle landing and solidifying on the workpiece in the way of an intended future cutting path. The likelihood of such interference is greater when lead-in length is reduced (e.g., when a shorter lead-in is used). As a torch passes through one of these solidified slag puddles, the slag puddle can cause the torch to crash to the workpiece and/or reduce the edge quality of the part being cut. This problem is enhanced by the randomness/lack of predictability of the location of slag puddle formation, which is exacerbated as the workpiece thickness increases. Therefore, there is a need for systems and methods that can optimize lead-in length requirement(s) for improving workpiece utilization while reducing the likelihood of the torch colliding with slag puddles during cutting of future parts from the workpiece.

SUMMARY

The present invention provides systems and methods for controlling the direction and/or size of slag puddle formations using a double-pierce non-direct and/or non-linear lead-in technique to cut a part from a workpiece. Further, the present invention provides systems and methods for designing a nest of multiple parts on a workpiece to leverage this ability. For example, efficient nest designs (e.g., tighter nesting) are provided that do not require secondary work while improving cut quality and consistency. In some embodiments, the effective lead-in lengths employed by the nest design of the present invention are about 35% to about 37% of the thickness of the workpiece, which is a significant reduction from the traditional lead-in lengths of about 100% to about 200% of workpiece thickness. Further, the nest design of the present invention is user-friendly, which makes the planning and cutting process more fool proof in comparison to the traditional designs. The nest designs of the present invention also improve workpiece utilization and reduce incidents of torch collision with slag puddles.

In one aspect, a computerized method is provided for selecting a direction of formation of a slag puddle on a workpiece during processing of the workpiece by a thermal processing torch. The computerized method includes causing, by a computing device, the thermal processing torch to emit a thermal arc to gouge the workpiece at a first location without piercing through the workpiece. The method also includes translating, by the computing device, the thermal processing torch from the first location to a second location along a first direction on the workpiece while the torch is gouging the workpiece, the first direction substantially along the selected direction of slag puddle formation. The gouging and translating cause formation of a trench in a surface of the workpiece in the first direction between the first and second locations. The method further includes causing, by the computing device, the thermal arc emitted by the thermal processing torch to pierce through the workpiece at the second location. The piercing through is adapted to cause the formation of the slag puddle along the selected direction as guided by the trench.

In some embodiments, the method further comprises directing, by the computing device, the thermal processing torch to continue to pierce through the workpiece from the second location in a second direction to cut a part from the workpiece. The second direction is different from the selected direction of the slag puddle formation. In some embodiments, the second direction is opposite from the selected direction of slag puddle generation.

In some embodiments, a distance between a center of mass of the slag puddle formation to the second location is about 1 to 2 times a thickness of the workpiece. In some embodiments, the gouging while translating has a duration of about 0.03 seconds to about 0.2 seconds depending on a thickness of the workpiece. In some embodiments, a speed of the translating motion is between about 10 inches per minute (IPM) to about 40 IPM. In some embodiments, the thermal processing torch comprises a plasma arc torch or a laser cutting torch.

In some embodiments, the method further comprises choosing, by the computing device, the first direction based on a position of a previous path of the thermal processing torch for cutting a previous part from the workpiece. In some embodiments, the choosing comprises ensuring that the first direction intersects the previous path such that the slag puddle formation is directed onto the previous cut part. In some embodiments, the choosing comprises ensuring that the first direction intersects the previous path such that the slag puddle formation is directed away from a subsequent cutting path for cutting a current part or a future part that is yet to be cut from the workpiece.

In some embodiments, the method further comprises displaying, by the computing device, estimated spray projections of a plurality of slag puddle formations from cutting corresponding ones of a plurality of parts from the workpiece. In some embodiments, the method further comprises staggering, by the computing device, the plurality of parts to be cut such that a center mass of a slag puddle formation corresponding to at least one part to be cut is projected to be located between parts adjacent to the at least one part.

In another aspect, a computerized method is provided for controlling cutting of a plurality of parts from a workpiece by a thermal processing torch. The method comprises receiving, by a computing device, information related to the plurality of parts to be cut from the workpiece by the thermal processing torch and generating, by the computing device, a layout of the plurality of parts to be cut based on the information. The method also includes predicting, by the computing device, a direction of slag puddle formation on the workpiece for each part during cutting based on the layout of the plurality of parts. The method further includes generating, by the computing device, a cutting plan that comprises at least one of: (i) determining a sequence of the plurality of parts to be cut such that the predicted direction of slag puddle formation for cutting at least one part is onto a processing path of a previously cut part; or (ii) determining, for at least one part, a cutting path that directs the corresponding slag puddle formation away from one or more of (i) the at least one part or (ii) a cutting path of a subsequent part.

In some embodiments, the method further includes visually displaying the predicted directions of slag puddle formation as splash zones on the workpiece for the plurality of parts. In some embodiments, each splash zone is visualized as a cone of about 60 degrees centered relative to the corresponding predicted direction of slag puddle formation.

In some embodiments, the prediction of the direction of slag puddle formation for a part is performed prior to cutting the part and is continuously updated during cutting.

In some embodiments, the cutting path that directs the corresponding slag puddle formation comprises (i) an initial pierce segment, (ii) a bridge segment, (iii) a lead-in segment and (iv) a full cutting path that cuts a geometry of the at least one part from the workpiece. In some embodiments, the initial pierce segment comprises a trench gouged into the workpiece along a first direction. The trench is generated by an initial piercing operation without penetrating an entire thickness of the workpiece. In some embodiments, the bridge segment corresponds to a second direction collinear with the first direction. In some embodiments, the lead-in segment corresponds to a third direction different from the first and second directions, the lead-in segment being generated by the thermal processing torch at a current setting that is about 50% higher than a current setting associated with generating the initial pierce segment. In some embodiments, the trench in the workpiece is configured to guide the slag puddle formation generated during cutting of the at least one part along the full cutting path. In some embodiments, a starting location of the initial pierce segment for the at least one part maintains a minimal separation distance from two adjacent parts of the at least one part. In some embodiments, the minimal separation distance between the starting location of the initial pierce segment for the at least one part and each of the two adjacent parts is about 60% of a thickness of the workpiece. In some embodiments, a predicted distance between a center of mass of the slag puddle formation to a starting location of the bridge segment is about 1 to 2 times a thickness of the workpiece.

In some embodiments, the layout of the plurality of parts comprises a staggered arrangement of the plurality of parts such that a predicted center mass of a slag puddle formation corresponding to at least one part of the plurality of parts is projected to be located between two parts adjacent to the at least one part.

In yet another aspect, a method of piercing a workpiece with a thermal processing torch is provided. The method comprises gouging, by a thermal arc emitted by the thermal processing torch, the workpiece along a first direction from a first location to a second location without piercing through the workpiece and ceasing movement of the plasma arc torch at the second location on the workpiece. The method also includes adjusting the thermal arc to transition from gouging to a subsequent piercing process during movement of the thermal processing torch from the first location to the second location. The method further includes directing, during the subsequent piercing process, the thermal arc of the thermal processing torch along a cutting path on the workpiece to pierce through the workpiece, thereby cutting out a part from the workpiece with a desired geometry.

In some embodiments, the gouging of the workpiece without piercing through the workpiece comprises an initial piercing process. In some embodiments, adjusting the thermal arc comprises transitioning from the initial piercing process to the subsequent piercing process by increasing a magnitude of a current setting by at least about 50%. In some embodiments, the directing of the thermal arc during the subsequent piercing process comprises (i) a bridge segment to stabilize the thermal arc for cutting after the initial piercing process and (ii) a lead-in segment to prepare for cutting of the part.

In some embodiments, the gouging establishes a predetermined direction for slag puddle flow that is adapted to be generated during the subsequent piercing process.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
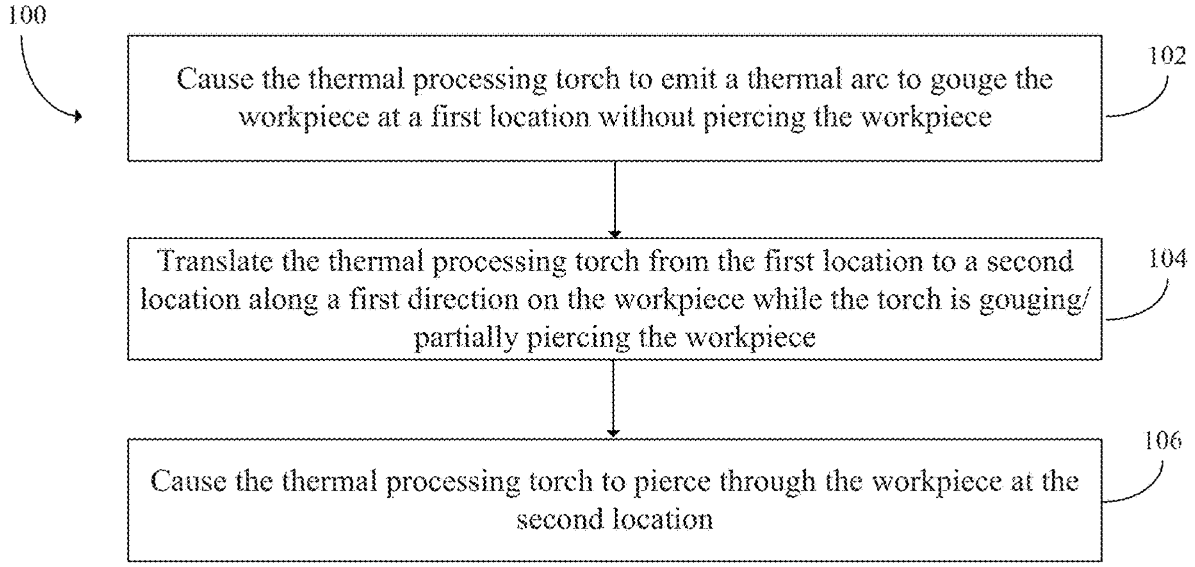
FIG. 1 shows an exemplary computerized process for controlling slag puddle formation on a workpiece during processing of the workpiece by a thermal processing torch, according to some embodiments of the present invention.

FIG. 1 shows an exemplary computerized process 100 for controlling slag puddle formation on a workpiece during processing of the workpiece by a thermal processing torch, according to some embodiments of the present invention. In general, the process 100 captures a lead-in design that controls the direction of slag puddle formation generated during workpiece cutting by directing the slag puddle along a desired flow direction, such as away from a current and/or future cutting path of the thermal processing torch. This computerized process 100 thus reduces the negative effect of slag puddle(s) on torch operation and part quality while optimizing (e.g., shortening) lead-in lengths, thereby reducing workpiece scrap/skeleton volume production. In some embodiments, the computerized process 100 is executed on a computerized control system of a thermal processing system. The control system can be in electrical communication with a thermal processing torch (e.g., a plasma arc torch or a laser cutting torch) of the thermal processing system to control operations of the torch in a manner specified by the computerized process 100. Details regarding the thermal processing system, including the computerized control system, will be described below in relation to FIG. 8.

As shown in FIG. 1, the process 100 starts with the control system actuating the thermal processing torch to emit a thermal arc to gouge the workpiece at a first location of a workpiece without piercing through the workpiece (step 102). The thermal arc can be a plasma arc if the torch is a plasma arc torch or a laser beam if the torch is a laser cutting torch. While gouging the workpiece without fully piercing the workpiece, the torch can be translated by the control system from the first location to a second location along a desired direction on the workpiece (step 104). This gouging and translation is adapted to cause formation of a trench in/from a surface of the workpiece in the desired direction between the first and second locations. After the trench is formed, the control system can cease the movement of the thermal processing torch relative to the workpiece and cause the torch to fully pierce through the workpiece at the second location (step 106). For example, ceasing torch motion and holding the torch at the second location for a short period of time can cause the plasma arc emitted from the torch to pierce the workpiece at that location. In some embodiments, step 104 is performed while the plasma system and/or plasma arc is ramping up to a pierce and or cut condition (e.g., the timing of step 104 substantially coincides with the standard/required ramp-up timing for the plasma system). In some embodiments, the pierce of step 106 is performed by a substantially fully ramped up arc at the end of the ramp-up process.

In some embodiments, a current of the thermal processing torch is ramped up during the translation motion of the torch to create the evacuation trench, such that when the torch reaches the second location the torch has obtained sufficient current to pierce through the workpiece. In some embodiments, one or more characteristics of the thermal arc emitted by the torch are optionally adjusted at the second location to pierce through the workpiece. In such a case, ceasing the movement of the torch and adjusting the thermal arc at the second location can occur substantially simultaneously. Exemplary characteristics adjusted at the second location can include torch current (e.g., increase the magnitude of the current setting by at least about 50%), torch height for cutting the workpiece, pierce height setting for minimizing splatter that may attached to the torch shield or nozzle, and/or puddle jump height setting for avoiding the splash of the anticipated slag puddle.

This piercing-through operation at the second location can constitute the beginning of a cut of a desired part from the workpiece or another segment of the lead-in path prior to cutting the desired part from the workpiece (as explained below in relation to FIGS. 2*a* and 2*b* and FIGS. 4*a* and 4*b*, for example). In some embodiments, the trench formation and the following piercing-through operation is collinear and do not involve a directional change of the torch. Alternatively, there is a directional change of the torch between the two operations. The subsequent cutting of the desired part is adapted to cause a slag puddle formation to fall substantially within and collinear with the trench (created at steps 102 and 104) along the desired direction as guided by the trench. In some embodiments, the process 100 further comprises causing the thermal processing torch to continue on from the second location to continue piercing through of the workpiece.

Thus, the process 100 uses a sequence of pierces (e.g., two pierces) to control the slag puddle direction on a workpiece. As described above, this sequence of pierces can be carried out in three main steps. Step 102 describes the performance of a partial piercing operation by the torch to create a dent on the surface of the workpiece at the first location. The partial pierce can have a duration of about 0.03 seconds to about 0.2 seconds, depending on the thickness of the workpiece. This partial pierce is followed by translating the torch across the workpiece to create an evacuation trench extending from the partial pierce at the first location to the desired second location where the full pierce through the workpiece would occur. In some embodiments, the translation motion is at a relative low speed and over a relative short distance to assist in the creation of the evacuation trench for influencing the flow of molten material during the subsequent full pierce/cutting. The relative short distance traveled for creating the evacuation trench can be about 0.02 inches to about 0.3 inches, depending on the thickness of the workpiece. The relative low speed traveled for creating the evacuation trench can be about 10 IPM (inches per minute) to about 40 IPM. Following the partial pierce and low speed path of travelling, step 106 of process 100 describes fully piercing the workpiece at the end of the evacuation trench (i.e., the second location) to commence the part cutting operation. During the full piercing/cutting operation, the resulting molten metal, material, slag (e.g., the slag puddle) is evacuated by influencing it to travel in the direction of the partial pierce as guided by the evacuation trench, which is likely to occur due to the lack of material in its way along the trench direction. In some embodiments, this full pierce has a duration similar to that of a regular pierce time for cutting a part from the workpiece.

In some embodiments, the travel direction of the slag puddle (i.e., the direction of the evacuation trench) is away from the path of the part being cut and/or away from any future cutting paths of neighboring parts that remain uncut. As an example, the control system can choose the direction of the evacuation trench to be different than, e.g., substantially opposite from, the direction of the instant cutting path and/or a future cutting path such that the slag puddle is directed away from the instant and/or future cutting path. As another example, the control system can choose the direction of the evacuation trench based on the position of a cutting path of the thermal processing torch for cutting a previous part from the workpiece. In some embodiments, the control system ensures that that the direction of the evacuation trench intersects a previous cutting path such that the slag puddle formation from cutting of the current part is directed onto the cutout associated with a previously-cut part. In some embodiments, such as for parts near an edge of the workpiece, the control system orients the evacuation trenches of these parts toward the edge such that the resulting slag puddles fall off the workpiece.

Traditionally, since the direction of a splash puddle formation is unpredictable and random, for the purpose of parts layout design, it is assumed that the splash puddle is circular around the starting pierce/cut location and has a radius of about 1 time the thickness of the workpiece. In contrast, the double pierce method 100 of FIG. 1 provides directionality to the splash puddle formation because the slag puddle produced from the full piercing/cutting of a part using this approach is directed along an evacuation trench generated from the double pierce method 100. In some embodiments, the slag puddle formed from the double-pierce method 100 has a center of mass from the starting pierce/cutting point that is about 1 to 2 times the thickness of the workpiece along the trench direction (e.g., in a known/controlled direction). Such controllability and predictability of the slag puddle formation can reduce spacing between parts in the nest design. For example, pierce point settings can be at about 63% of part spacing requirements, and part spacing requirements can be about 75% of workpiece thickness.

Figure 2A:
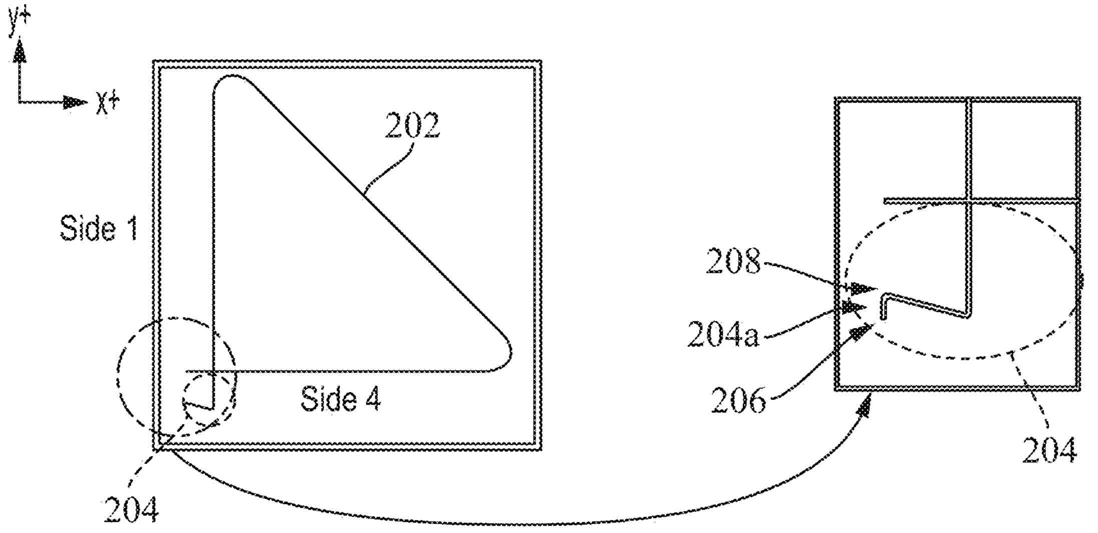
FIGS. 2*a* and 2*b* show an exemplary lead-in path prior to cutting a part from a workpiece created using the process of FIG. 1, according to some embodiments of the present invention.
Figure 2B:
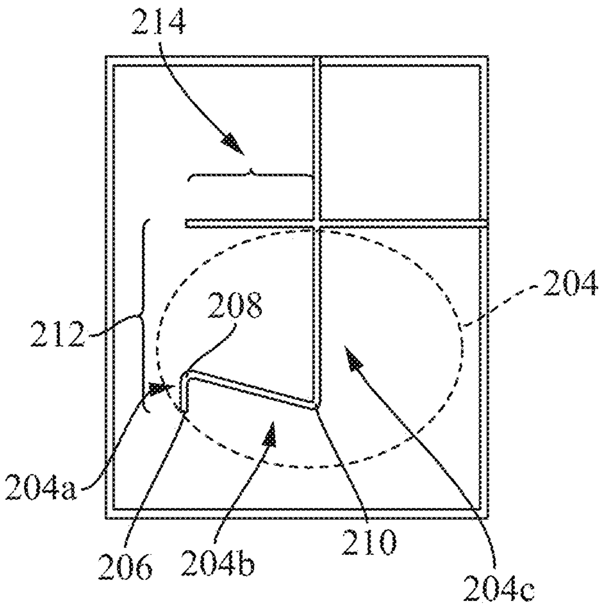

FIGS. 2*a* and 2*b* show an exemplary lead-in path 204 prior to cutting a part from a workpiece created using the process 100 of FIG. 1, according to some embodiments of the present invention. As shown, the cutting path 202 for the part is triangular in geometry and the lead-in path 204 leading to the cut path 202 is z-shaped. More specifically, as illustrated in FIG. 2*b*, the z-shaped lead-in path 204 comprises three segments: (i) a first segment 204*a* generated using the process 100 of FIG. 1, (ii) a second segment 204*b* forming a bridge segment, and (iii) a third segment 204*c* that is similar to a traditional lead-in, but shortened (e.g., compacted), for example. The first segment 204*a* comprises an evacuation trench for directing any subsequent slag formation. As explained above, the first/starting location 206 of the first segment 204*a* is the start of the first (partial) pierce. The torch then moves slowly along the first segment 204*a* until it reaches the second/end location 208 of the first segment 204*a*, which is the start of the second (full) pierce. Upon reaching the location 208 of the full pierce, a more traditional pierce is performed that fully pierces the workpiece. Following the full pierce, a change in the torch direction occurs to create the second segment 204*b* of the lead-in path 204. The second segment 204*b* serves as a bridge segment that increases the actual length of the lead-in path 204 to stabilize and develop the plasma arc, improve cut edge quality, as well as further helping to move the slag puddle away from the cutting part 202. The bridge segment 204*b* is adapted to fully pierce through the workpiece starting from the second location 208 and ends at the third location 210. Upon reaching the third location 210, torch direction changes again to generate the third segment 204*c* of the lead-in path 204. The third segment 204*c* is shorter than a traditional lead-in; the third segment 204*c* has just enough length to allow the thermal processing torch to fully develop consistent torch motion, since the thermal arc is already largely stabilized and developed during the previous bridge segment 204*b*. In some embodiments, torch setting fining tuning (e.g., kerf offset adjustment) is performed by the control system during the third segment 204*c* in preparation for subsequently cutting the part from the workpiece. As shown, the lead-in segment 204*c* starts at the third location 210 and continues on to the part cutting path 202. As can be seen in FIGS. 2*a* and 2*b* the several segments of the double pierce method of embodiments of the invention split/separate/segment motion of the torch across multiple directions of the plate (as opposed to traditional mono-directional lead-ins) compacting the directional footprint of the lead-in path.

In general, the lead-in path 204 of FIGS. 2*a* and 2*b* shortens the effective lead-in length 212 (as shown in FIG. 2*b*) and steers the pierce puddle formation away from the cutting path 202 of the desired part. The effective lead-in length 212 can be the distance from the starting point 206 of the first segment 204*a* to the start of the part/the actual cut of the part. The effective lead-in length 212 represents the total distance the torch/arc travels to develop suitable motion and stability characteristics to begin cutting a part of sufficient quality. This effective lead-in length 212 is both overall shorter than a traditional lead-in in length and also is split across two directions, thereby significantly reducing its footprint in any one direction relative to a traditional lead-in. In this example, the effective lead-in length 212 is the same as the length of the third segment 204*c*. In some embodiments, the actual length of the lead-in path 204 may be similar to that of a traditional lead-in, but the effective lead-in length 212 is shorter because the lead-in design of path 204 is more compact, thus allowing the parts to be laid out/nested closer together. In some embodiments, after the desired part is cut, the torch continues to pierce through the workpiece along the lead-out segment 214 before the plasma arc is removed from the workpiece. In some embodiments, the lead-out segment 214 aligns/overlaps with at least a portion of the lead-in path 204 (e.g., along the x-axis as shown in FIGS. 2*a* and 2*b*) so as to facilitate compact nesting of parts. In some embodiments, instead of a z-shaped lead-in path, the first segment 204*a* and the second segment 204*b* can be substantially collinear while the third segment 204*c* can have a different orientation. In this design, after the evacuation trench is formed along the first segment 204*a*, the thermal processing torch can cease motion at location 208 prior to starting to pierce through the workpiece along the second segment 204*b* in the same direction as (i.e., collinear with) the first segment 204*a*.

Figure 3:
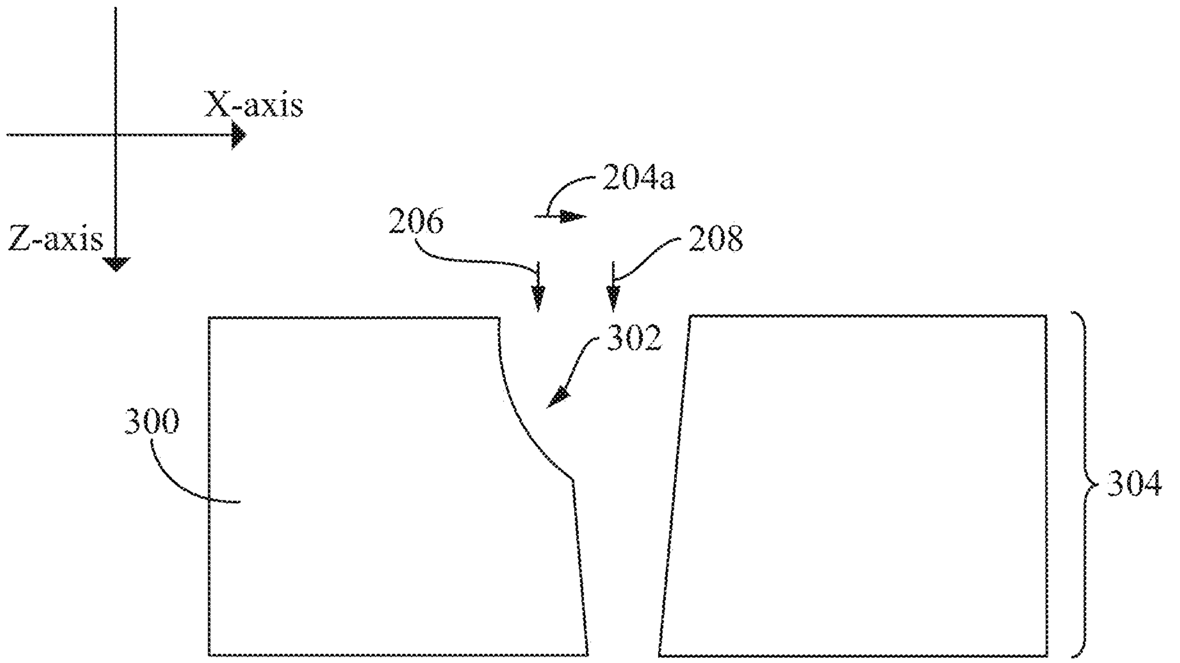
FIG. 3 shows a cross-sectional view of the workpiece after the completion of the first segment of the lead-in path illustrated in FIGS. 2*a* and 2*b*, according to some embodiments of the present invention.

FIG. 3 shows a cross-sectional view of the workpiece 300 after the completion of the first segment 204*a* of the lead-in path 204 illustrated in FIGS. 2*a* and 2*b*, according to some embodiments of the present invention. The x-axis as labeled in FIG. 3 is parallel to a surface of the workpiece 300 while the z-axis as labeled is in the direction of the thickness 304 of the workpiece 300. As explained above, the first lead-in segment 204*a*, which is completed using the double pierce process 100 of FIG. 1, includes a partial pierce at the first starting location 206 on the workpiece 300 and a full pierce at the second location 208 of the workpiece 300. As shown in FIG. 3, the first/partial pierce at the starting location 206 does not fully pierce through the entire thickness 304 of the workpiece 300, but rather indents/gouges the workpiece 300, thereby creating a pit and beginning to establish a stable plasma arc between the workpiece 300 and the torch (not shown). As the torch is translated along the first segment 204*a* during the partial pierce, the torch is adapted to remove a portion of the workpiece 300 to create an evacuation trench 302 into the thickness 304 of the workpiece 300 extending along the direction of travel. Once the plasma arc delivered by the torch reaches the desired end location 208 on the workpiece 300 for the full pierce, the torch initiates a full pierce operation that penetrates through the entire thickness 304 of the workpiece 300. In some embodiments, the pierce/slag material generated by the full pierce at location 208 and beyond is influenced by and evacuated to the trench 302 created via the partial pierce and the translation motion of the segment 204*a*. In this manner, the majority of the slag puddle generated from the subsequent piercing of the cutting path 202 of FIGS. 2*a* and 2*b* is directed toward the partial pierce location 206 in the desired direction along segment 204*a* (e.g., through evacuation trench 302).

Figure 4A:
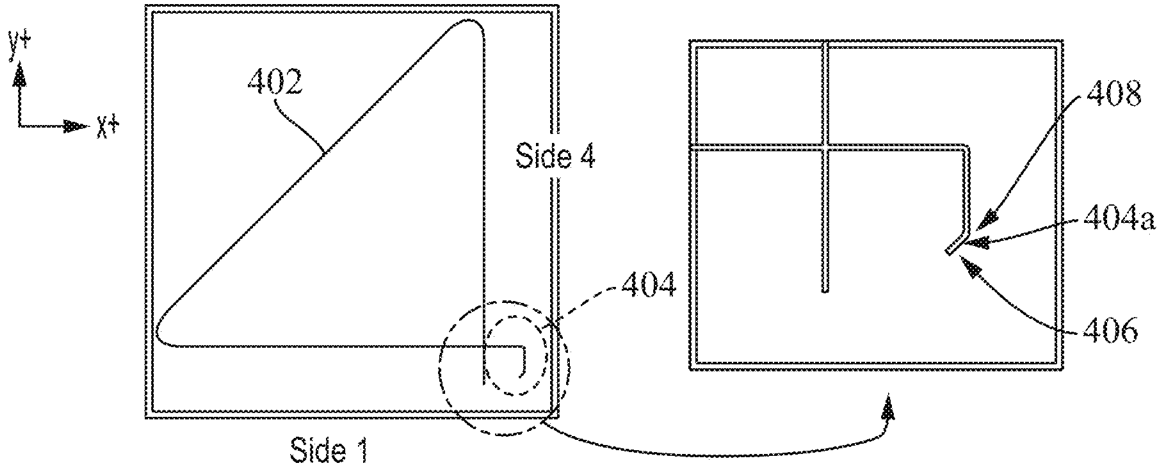
FIGS. 4*a* and 4*b* show another exemplary lead-in path prior to cutting a part from a workpiece created using the process of FIG. 1, according to some embodiments of the present invention.
Figure 4B:
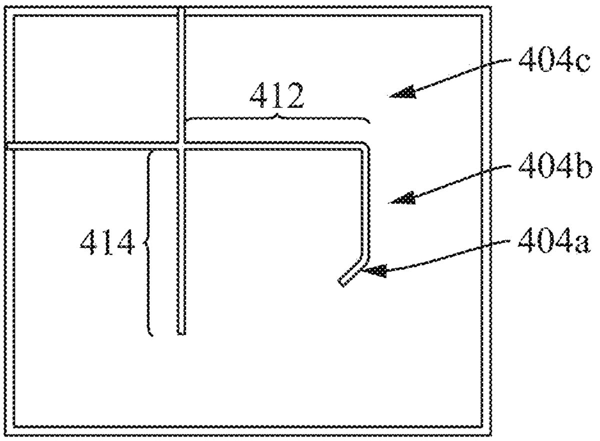

FIGS. 4*a* and 4*b* show another exemplary lead-in path 404 prior to cutting a part from a workpiece created using the process 100 of FIG. 1, according to some embodiments of the present invention. As shown, the cutting path 402 for the part is also triangular in geometry and the lead-in path 404 leading to the cut path 402 is L-shaped, which dependent upon nesting considerations may be preferable over the Z-Shaped lead-in path 204 of FIGS. 2*a* and 2*b* under some circumstances. As shown in FIG. 4*b*, the lead-in path 404 comprises three segments: (i) a first segment 404*a* generated using the process 100 of FIG. 1, (ii) a second segment 404*b* forming a bridge segment, and (iii) a third segment 404*c* that is similar to the lead-in segment 204*c* of the lead-in path 204 described above with reference to FIGS. 2*a* and 2*b*. For example, the third segment 404*c* can be much shorter than a traditional lead-in and used to fully prepare the thermal processing torch for the subsequent cutting of the part. The first segment 404*a* includes an evacuation trench for directing any subsequent slag formation. More specifically, as illustrated in FIG. 4*a*, the first/starting location 406 of the first segment 404*a* is the start of the first (partial) pierce. The torch then moves slowly along the first segment 404*a* until it reaches the second/end location 408 of the first segment 404*a*, which is the start of the second (full) pierce. In some embodiments, the cross-sectional view of the workpiece after completing the first segment 404*a* is substantially the same as that of the workpiece 300 of FIG. 3. After completing the first segment 404*a*, the torch performs a more traditional full pierce that involves a change in the torch direction to create the second segment 404*b* of the lead-in path 404. The second segment 404*b* serves as a bridge segment that stabilizes and develops the thermal arc and cut edge as well as to further help moving the slag puddle away from the cutting part 402. After completing the second segment 404*b*, torch direction changes again to create the third segment 404*c* of the lead-in path 404 that subsequently continues on to the part cutting path 402. The third segment 404*c* is similar to a traditional lead-in.

The L-shaped lead-in path 404 of FIGS. 4*a* and 4*b* also shortens the effective lead-in length 412 (as shown in FIG. 4*b*) and steers the pierce puddle formation away from the cutting path 402 of the desired part. Similar to the lead-in path 204 of FIGS. 2*a* and 2*b*, the actual length of the lead-in path 404 may be comparable to that of a traditional lead-in, but the effective lead-in length 412 is shorter because the lead-in design of path 204 is more compact, thus allowing the parts to be laid out/nested closer together. In some embodiments, after the desired part is cut, the torch continues to pierce through the workpiece along a lead-out segment 414 before the plasma arc is removed from the workpiece. In some embodiments, the lead-out segment 414 aligns/overlaps with at least a portion of the lead-in path 404 (e.g., along the z-axis as shown in FIGS. 4*a* and 4*b*) so as to allow for compact nesting of parts. In some embodiments, the angle between the first segment 404*a* and the second segment 404*b* is selected/adjusted to precisely control the direction of formation of the slag puddle. For example, the angle can be about 0 degrees, 30 degrees, 60 degrees, 90 degrees, 180 degrees etc. Thus, the first and second segments 404*a, b* can be substantially collinear while the third segment 404*c* is oriented in a different direction. In some embodiments, this angle is selected to direct the puddle to form just past the termination of the lead-out segment 414 so as not to affect the lead-out segment 414.

In some embodiments, the double-pierce technique 100 for creating at least a section of a lead-in path (e.g., lead-in path 204 of FIG. 2*a, b* or lead-in path 404 of FIG. 4*a, b*) is adapted to establish an effective lead-in length (e.g., length 212 of FIG. 2*a, b* or length 412 FIG. 4*a, b*) that is about 60% (or less) of the thickness of the workpiece. This effective lead-in length is significantly reduced in comparison to a traditional lead-in length that is about the full thickness of a workpiece. Such a reduced effective lead-in path can be achieved via compact lead-in path designs as described above, wherein the lead-in path can be non-linear and/or overlap with the lead-out path. Utilizing these lead-in path designs, a part program can produce a denser and more efficient nesting of parts on a workpiece. The part program can also balance a reduced effective lead-in length with lead out impacts. In addition to generating L or Z-shaped lead-ins, the control system of the thermal processing system of the present invention can employ the double-pierce process 100 of FIG. 1 in the context of lead-in of other shapes and dimensions. In general, the control system can generate different lead-ins for different outcomes or part geometries utilizing the double-pierce process 100 described above, these different lead-ins being chosen and/or designed to maximize the impact and influence of certain settings as discussed herein.

Figure 5:
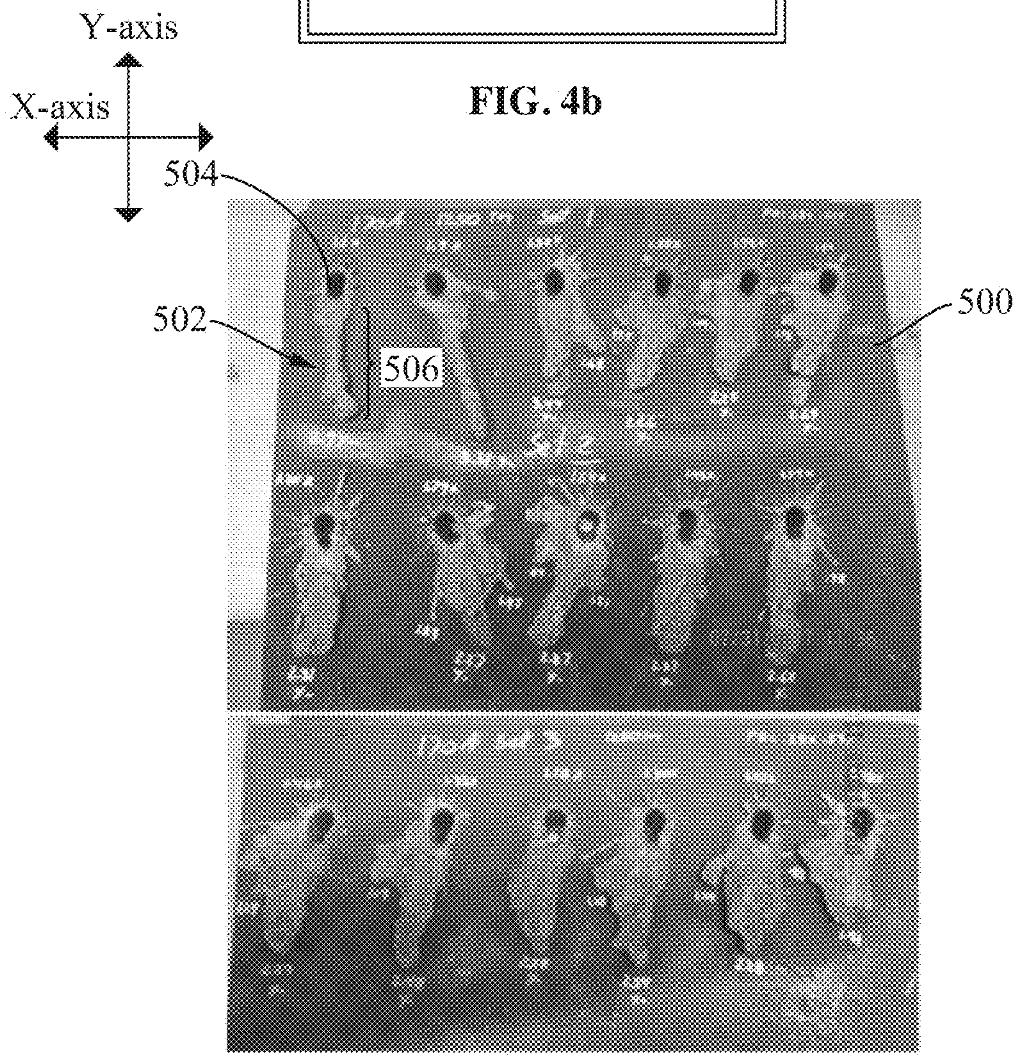
FIG. 5 shows exemplary segments produced on a workpiece using the double pierce process 100 of FIG. 1, according to some embodiments of the present invention.

FIG. 5 shows exemplary segments 502 (e.g., for directing slag puddles) produced on a workpiece 500 using the double pierce process 100 of FIG. 1, according to some embodiments of the present invention. These segments 502 are generated by a plasma are torch operating at about 170 amps on a workpiece 500 of mild steel that is about 1.25 inches thick. Each segment 502 is produced by the sequence of (i) a partial pierce, (ii) a translation motion in the Y-direction to create an evacuation trench, and (iii) a full pierce 504 at the end of the segment 502, as described above in detail in relation to FIG. 1. Each full pierce 504 is adapted to generate a pierce puddle 506. As shown, the majority of the pierce puddles 506 are controlled well and are directed to flow in the desired Y-direction toward the partial pierce as guided by the evacuation trench. In some embodiments, each slag puddle has a center of mass from the full pierce location 504 that is about 1 to 2 times the thickness of the workpiece 500.

Figure 6:
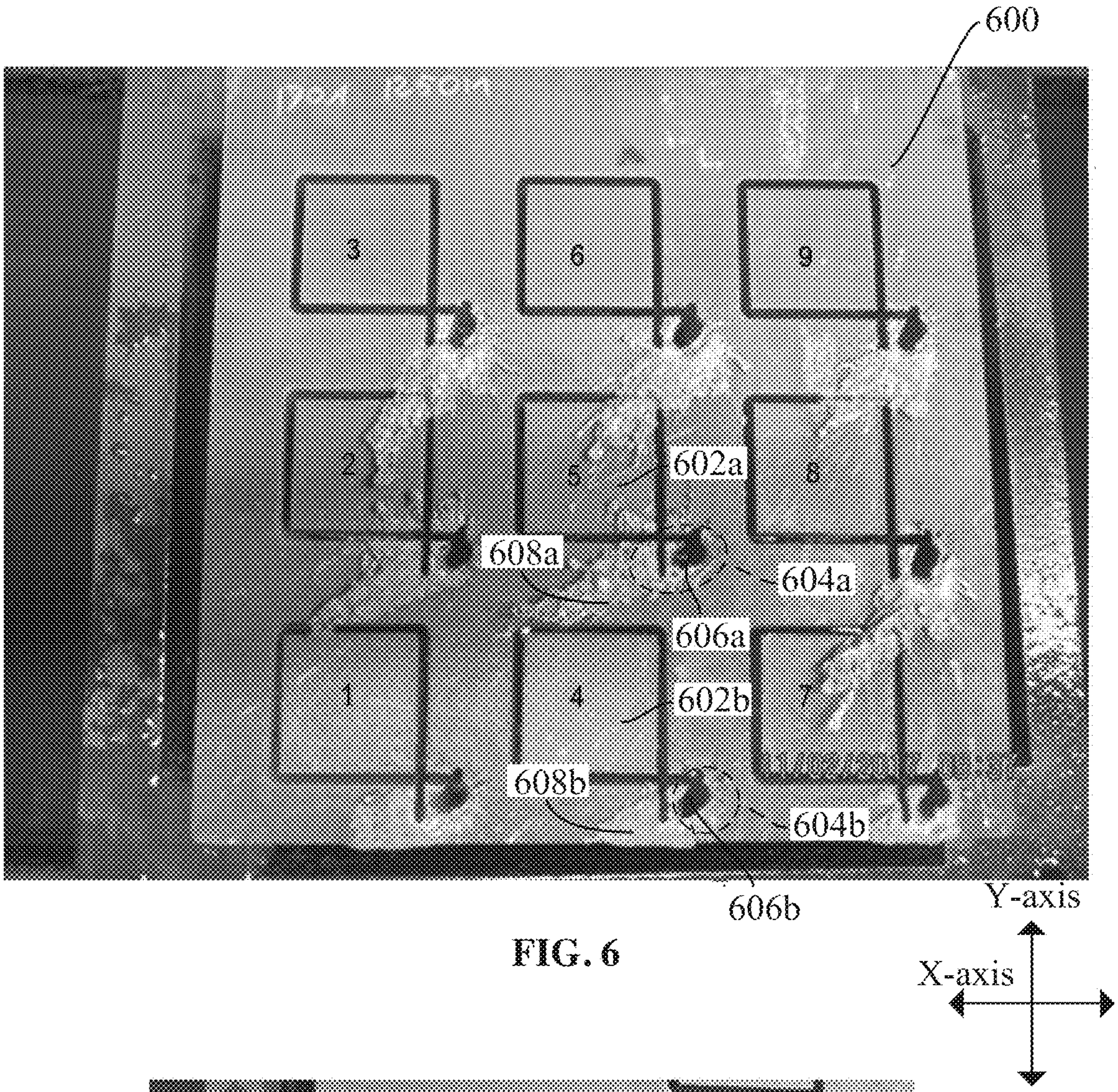
FIG. 6 shows exemplary cutting results on a workpiece after applying the L-shaped lead-in technique explained above with reference to FIGS. 4*a* and 4*b* to cut a series of square parts, according to some embodiments of the present invention.

FIG. 6 shows exemplary cutting results on a workpiece 600 after applying the L-shaped lead-in technique explained above with reference to FIGS. 4*a* and 4*b* to cut a series of square parts 602, according to some embodiments of the present invention. More specifically, three rows and three columns of nine square parts 602 are cut from the workpiece 600 in a sequence from 1-9 as labelled in FIG. 6, with Square 1 being the first to be cut and Square 9 being the last. For each square part 602, the lead-in path 604 is arranged such that the first segment 606 of the lead-in path 604 (where the double-pierce technique is applied to generate this segment 606) is directed toward an adjacent part that has already been cut (e.g., for interior parts) or toward an edge of the workpiece 600 (e.g., for edge parts). For example, the first segment 606*a* of the lead-in path 604*a* to cut the interior square part 602*a* is oriented diagonally toward the adjacent square part 602*b* location below in the y-direction, where the adjacent square part 602*b* is already cut prior to the cutting of the part 602*a* and where the majority (e.g., center of mass) of the slag puddle will fall/form between the two parts on scrap/the skeleton. Therefore, the slag puddle formation 608*a* from the cutting of the square part 602*a* is directed toward the perimeter of the already cut part 602*b*. In another example, when cutting square part 602*b*, since this square part 602*b* is along the border of the workpiece 600, the first segment 606*b* of its lead-in path 604*b* can be oriented toward the edge of the workpiece 600 so as to not interfere with other parts. A similar off-the-edge lead-in path 604*b* can be applied to each one of the edge parts 1, 4 and 7. In general, using the double-pierce technique 100 of FIG. 1, slag puddle(s) can be controllably directed to areas of a workpiece where parts had already been cut or are absent from the workpiece. Thus, these slag puddles would not affect future cutting operations and parts. In some embodiments, such slag puddle control and timing/order can be factored and determined by the computerized control system prior to torch operation, which will be explained below in detail.

Figure 7:
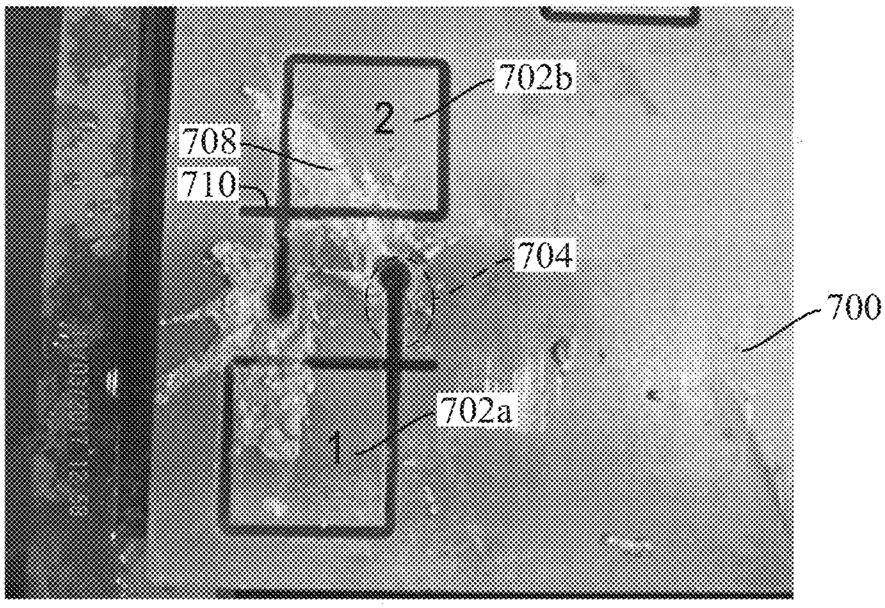
FIG. 7 shows exemplary cutting results on a workpiece after applying a traditional lead-in technique to cut a series of square parts.

FIG. 7 shows exemplary cutting results on a workpiece 700 after applying a traditional lead-in technique to cut a series of square parts 702. Since a traditional lead-in path 704 in this case comprises a straight line lead-in into the first edge of the square part 702 to be cut, the slag puddle formation 708 generated from the resulting cut has no controlled flow direction, is broader and more distributed as shown, and is likely to form in the future cutting path of an adjacent square part yet to be cut. Thus, the slag puddles 708 generated from using a traditional lead-in technique has a greater chance of affecting future cutting operations and parts, and as a result nest operations need to anticipate/account for a larger potential slag puddle influence zone which could form in all directions. For example, as shown in FIG. 7, the slag puddle 708 formed from cutting square part 702*a* falls onto the cutting path planned for square part 702*b*, which remains uncut at the time of cutting square part 702*a*. In addition, the traditional lead-in path 704 is not compact (e.g., merely a straight line) without any overlap with the lead-out segment 710. Therefore, the parts 702 need to be spaced further apart as a result of the longer non-overlapped lead-ins 704. In some embodiments, an effective length of the traditional lead-in path 704 is about 100% of the thickness of the workpiece 700. This is much longer than an effective length of a lead-in path designed using the systems and methods of the present invention (e.g., paths 604 of FIG. 6), which can be about 60% of plate/workpiece thickness or less, such as about 35% to about 37%, of the workpiece thickness.

When compared to the uncontrolled slag puddles 708 formed by the traditional long lead-in technique(s) (e.g., the slag puddles 708 shown in FIG. 7), the double-pierce technique and lead-in approaches of the present invention can create slag puddle(s) in a controlled direction with regularity and shortened effective lead-in lengths (e.g., the slag puddles 608 shown in FIG. 6), which produce more efficient nests and utilization of the workpiece. Benefits include reducing the chances of the thermal processing torch crashing on the workpiece due to the presence of a slag puddle, reducing the chances of cut quality deterioration on cut parts due to slag puddle influences, shortening effective lead-in lengths with controlled slag puddle flowing direction, and reducing material scrap production, which reduces customer material cost. In some embodiments, for cutting a single part (e.g., an interior part or tabbing of a part), multiple double pierces and/or partial pierces are used in a single lead-in path for that part to control slag puddle direction, thereby reducing negative influences of the resulting slag puddle and further reducing the lead-in length.

Figure 8:
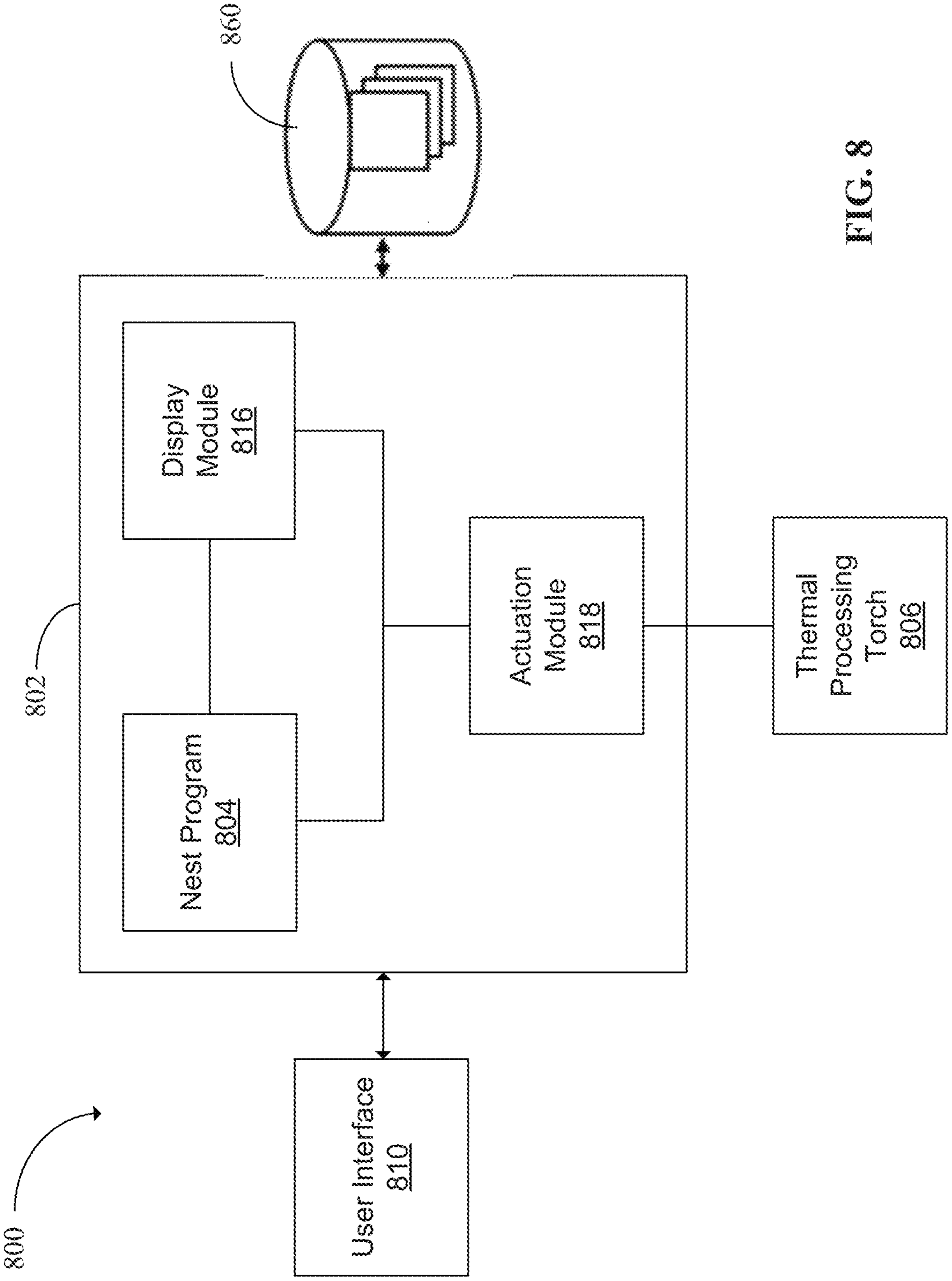
FIG. 8 shows a block diagram of an exemplary thermal processing system that includes a computerized control system configured to execute a nest program for controlling operations of a thermal processing torch, according to some embodiments of the present invention.

In another aspect, systems and methods are provided to generate a nest program that automates and controls cutting of one or more parts from a workpiece by a thermal processing torch. Such a nest program provides a number of benefits including reducing the negative influences of slag puddle formation during cutting, optimizing effective lead-in lengths, minimizing scrap production (e.g., reduce workpiece space consumption of the lead-ins) and improving cut quality. In some embodiments, the nest program is implemented on a computerized control system that is configured to manipulate the operation of the thermal processing torch based on the layouts and/or parameter settings specified by the nest program. FIG. 8 shows a block diagram of an exemplary thermal processing system 800 that includes a computerized control system 802 configured to execute a nest program 804 for controlling operations of a thermal processing torch 806, according to some embodiments of the present invention. As shown, the thermal processing system 800 generally includes the control system 802, a user interface 810, a memory store 860 and the thermal processing torch 806.

In some embodiments, the user interface 810 comprises a computer keyboard, a mouse, a graphical user interface (e.g., a computerized display), other haptic interfaces, voice input, or other input/output channels for an operator to communicate with the control system 802 to configure the nest program 804. The user interface 810 also can provide visualization of a workpiece to be processed by the thermal processing torch 806 along with one or more of a layout of one or more parts to be cut from the workpiece, planned torch motions to execute the cut(s), and other processing recommendations determined by the nest program 804. In some embodiments, the control system 802 is in electrical communication with the thermal processing torch 806 to automate or otherwise direct the torch 806 to follow the torch motions determined by the nest program 804 for the purpose of processing (e.g., cutting) the workpiece. The torch 806 can be a plasma arc torch or a laser cutting torch.

As shown in FIG. 8, the control system 802 of the thermal processing system 800 includes the nest program 804, a display module 816 and an optional actuation module 818. These components can be implemented in hardware only or in a combination of hardware and software to control cutting operations by the torch 806. In general, the nest program 804 can be configured to provide a nest/layout of the parts to be cut from a workpiece, a sequence of cuts to be made, and a plan of directing the torch to make each cut, including a lead-in path prior to cutting each part, a cutting path for piercing the desired geometry of each part from the workpiece, and/or a lead-out path after cutting each part. Details regarding the nest program 804 are provided below. The display module 816 is configured to interact with the user interface 810 to visualize the planned layout of the parts, the sequence of torch motions and other processing information determined by the nest program 804. Such a display encourages user interaction with the control system 802 to change and/or refine the processing details prior to performing the actual cutting. The optional actuation module 818, which is in electrical communication with the nest program 804, can actuate the torch 806 to follow the motions determined by the nest program 804 for cutting the desired parts from the workpiece.

In some embodiments, the memory store 860 of the thermal processing system 800 is configured to communicate with one or more of the nest program 804, the display module 816 and the actuation module 818 of the control system 802. For example, the memory 860 can be used to store data related to the workpiece and the torch 806, inputs provided by the operator to configure the nest program 804, one or more functions and values used by the nest program 804 to determine torch motions, and/or instructions formulated by the actuation module 818 to direct the movement of the torch 806.

In some embodiments, the nest program 804 incorporates an Advanced Arc Stabilization ("AAS") module that is configured to quickly stabilize a thermal arc from the torch 806 and enable shorter lead-ins to be established prior to cutting desired parts. In some embodiments, the nest program 804 incorporates a Scrap Reduction Lead (SRL) module (also referred to as a platesaver module) that automatically and strategically designs and places interior and exterior lead-ins for various parts to be cut from a workpiece. For example, the SRL module can strategically position each lead-in for a part so as to prevent the resulting slag puddle formed from cutting the part from impacting another part yet to be cut. The SRL module can implement the double-pierce technique 100 described above with reference to FIG. 1 for generating these lead-ins to control the size and/or direction of the resulting slag puddles. For example, the partial pierce motion for generating an evacuation trench can be slowed without piercing through the workpiece to increase trench depth which as a result narrows and lengthens the subsequent slag puddle formation. Additionally, in some embodiments, the nest program 804 can first nest/arrange the parts on the workpiece without regard to lead-ins, and then position the lead-ins on the parts (e.g., with a directed moving pierce and shortened lead length) by executing the SRL module, thereby allowing part placement and not lead placement to drive nest design and selection. This process allows for closer part spacing, better material utilization (e.g., more parts to be placed per workpiece), reduced cost per part, reduced setup time for additional plates, and reduced scrap. In some embodiments, the nest program 804 can adjust the position of some or all of the nested parts to be cut along with adjusting lead-in and lead-out positions to improve workpiece part density and cutting results. In some embodiments, the nest program 804 incorporates a machine setup module with its nest design. The machine setup module is configured to provide strategic adjustments to the interior leads, exterior leads, process parameters, and/or lead-in designs generated by the SRL module, such as adjustments to torch motion and/or table characteristics and limitations.

When nesting with traditional pierce operations it is common to account for a splash zone about the pierce location (e.g., a 360 degree circle about the center of the pierce location) that has a radius of between about 4 and about 6 times pierce separation (i.e., the diameter of a hole in the workpiece created by a pierce). The splash zone estimates an area of the workpiece that is likely to be affected by slag puddle formation and projection during cutting of the part. In some embodiments, the SRL module of the nest program 804 is configured to calculate a splash zone on a workpiece relative to a part to be cut. For example, with some embodiments of the invention, the splash zone can be a pie-shaped area of about 60° centered about and aligned with the evacuation trench created by the double-pierce process 100 described above. In some embodiments, the known directionality of the splash zone increases plate utilization and reduces collision risk creating a narrow splash puddle in a known area with a center of mass that is located between about 2 and about 5 times pierce separation from the center of the pierce location. In some embodiments, the SRL module can interact with the display module 816 of the control system 802 to visually illustrate the splash zone of a part to be cut. Further, the SRL module can calculate splash zones for multiple parts to be cut from the workpiece and cause the display module 816 to display the estimated spray zones of slag puddles likely to be formed from cutting corresponding ones of the multiple parts.

In some embodiments, the SRL module of the nest program 804 is configured to determine an optimal location for the initial pierce of a lead-in path for a part such as to maximize the distance between pierce to part and pierce to one or more other parts adjacent to the part. This location allows parts to be positioned closer together on a workpiece, thereby improving nest utilization. More specifically, the SRL module is configured to determine a minimal optimal spacing between (i) an initial pierce for a part to be cut and (ii) the part to be cut as well as the parts adjacent to the part to be cut. The initial pierce is defined as the first pierce of the lead-in path associated with a part, which can be the first pierce of the double-pierce process 100 described above for creating an evacuation trench for the part. This minimal spacing between the initial pierce and the three parts under consideration can be about 60% (e.g., about 37% to about 35%) of the thickness of the workpiece. In some embodiments, the SRL module can interact with the display module 816 of the control system 802 to visually illustrate the placement of the initial pierce for a part and its separation from that part as well as from the adjacent parts.

In general, the SRL module of the nest program 804 can be configured to perform the following functions: shorten lead length due to the quicker torch stabilization property, allow closer placement of parts, reduce slag puddle impact on pending cuts using the double pierce technique 100 of FIG. 1 such that the slag puddles can be controllably directed away from the pending cuts, and allow a pierce point to be closer to a pending cut. The SRL technology thus helps to create better quality cut parts because the slag puddles are directed away from uncut parts and toward the edge of a workpiece when possible. In some embodiments, the SRL module is configured to determine an optimal sequence of torch motions (e.g., an order of multiple parts to be cut from a workpiece) by taking into consideration the splash zone sizes, occurrences and/or locations. In some embodiments, the computerized control system 802 automatically implements outputs from the nest program 804 (e.g., via the actuation module 818) by operating the thermal processing torch 806 in a manner consistent with the design of the nest program 804, such as applying improved and/or optimized SRLs to parts (e.g., during part import or in Advanced Edit) specified by the nest program 804.

Figure 9:
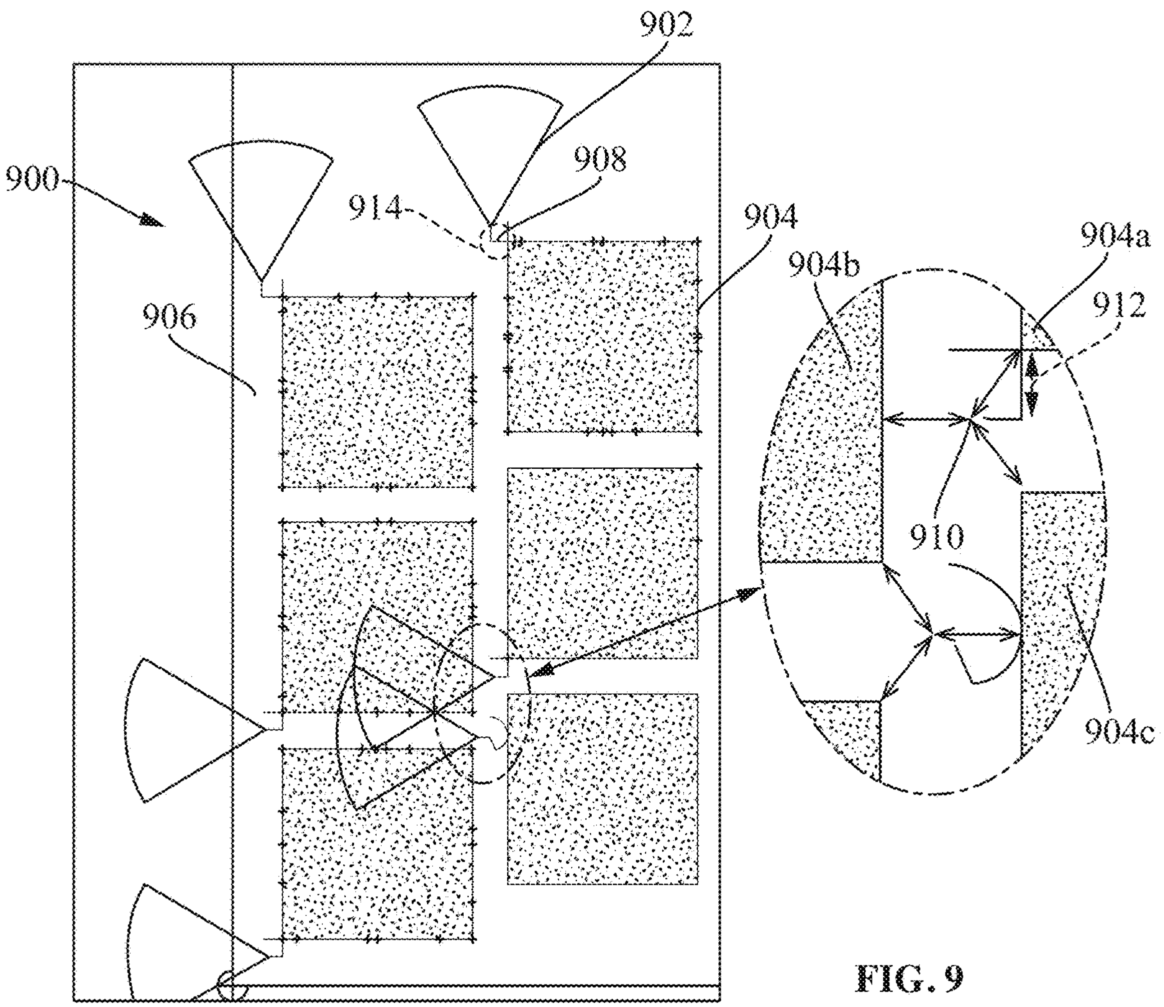
FIG. 9 shows an exemplary display provided by the display module for visualizing outputs from the nest program of the computerized control system of FIG. 8, according to some embodiments of the present invention.

FIG. 9 shows an exemplary display 900 provided by the display module 816 for visualizing outputs from the nest program 804 of the computerized control system 802 of FIG. 8, according to some embodiments of the present invention. The display 900 can visualize a planned layout of multiple square parts 904 to be cut from a workpiece 906 as determined by the nest program 804. As shown, the parts 904 are arranged in staggered columns on the workpiece 906. This staggered layout ensures that a center mass of slag puddle formation corresponding to a part 904 to be cut is projected between two adjacent parts 904. The display 900 can also illustrate a lead-in path 914 associated with each square part 904. In some embodiments, the lead-in path 914 is determined and/or adjusted by the SRL module of the nest program 804. For example, the SRL module can employ the double-pierce process 100 of FIG. 1 to determine at least one segment 908 of the lead-in path 914 that can create an evacuation trench for directing slag puddle formation away from the cutting path. In some embodiments, the effective lead-in length 912 of each lead-in path 914 is set to about 37.5% of the thickness of workpiece 906. In some embodiments, the effective lead-in length 912 is about 50% of part spacing, where part spacing represents the requisite minimum spacing between parts to be cut. The display 900 can further illustrate splay zones 902 and pierce locations 910 calculated by the SRL module of the nest program 804 for the multiple square parts 904. Each splash zone 902 for a part 904 can be centered about and aligned with the planned evacuation trench 908 formed by the double-pierce process 100. Each pierce location 910 for a part 904*a* can be about equidistant to that part 904*a* and the adjacent parts 904*b*, 904*c*.

Figure 10:
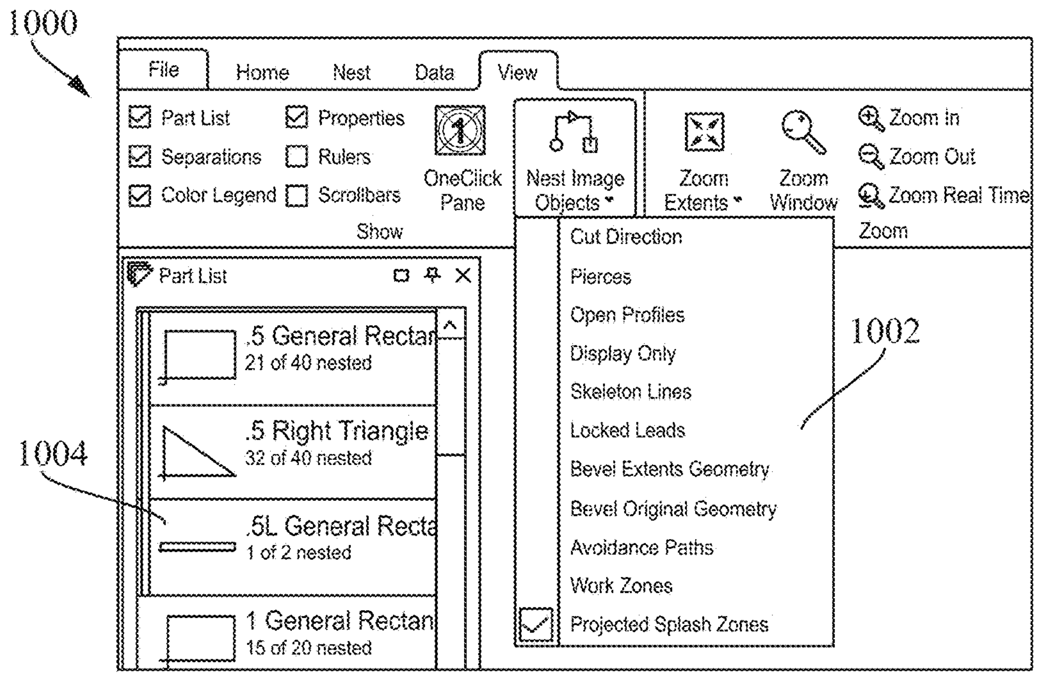
FIG. 10 shows a series of exemplary pull-down menus of the nest program of FIG. 8 selectable by an operator to specify the simulation and display of one or more projected splash zones, according to some embodiments of the present invention.

In some embodiments, the nest program 804 of the control system 800 is configurable by an operator (e.g., via the user interface 810 of the computerized control system 800) to customize one or more features associated with the parts layout, torch motions, cutting paths, and/or other cutting considerations determined by the nest program 804. For example, the operator can choose one or more options from the nest program 804 to instruct the nest program 804 to run a simulation that estimates splash zones corresponding to parts to be cut from a workpiece. The operator can also choose preferred display options associated with the projected splash zones. The operator can further adjust one or more of the splash zones in terms of size and/or direction. FIG. 10 shows a series of exemplary pull-down menus of the nest program 804 of FIG. 8 selectable by an operator to specify the simulation and display of one or more projected splash zones, according to some embodiments of the present invention. As shown, the operator can simply navigate a graphical user interface 1000 to choose (i) a pull-down menu 1002 to instruct the nest program 804 to estimate the splash zones and (ii) another pull-down menu 1004 to indicate how the splash zones are displayed relative to the parts to be cut on the workpiece.

In some embodiments, the display 900 described above with reference to FIG. 9 can represent an exemplary output from such simulation. More specifically, the set of projected splash zones 902 visualized by the display 800 can be customized by an operator via the nest program 804. This display 900 is viewable by the operator from the user interface 810 of the thermal processing system 800.

Figure 11:
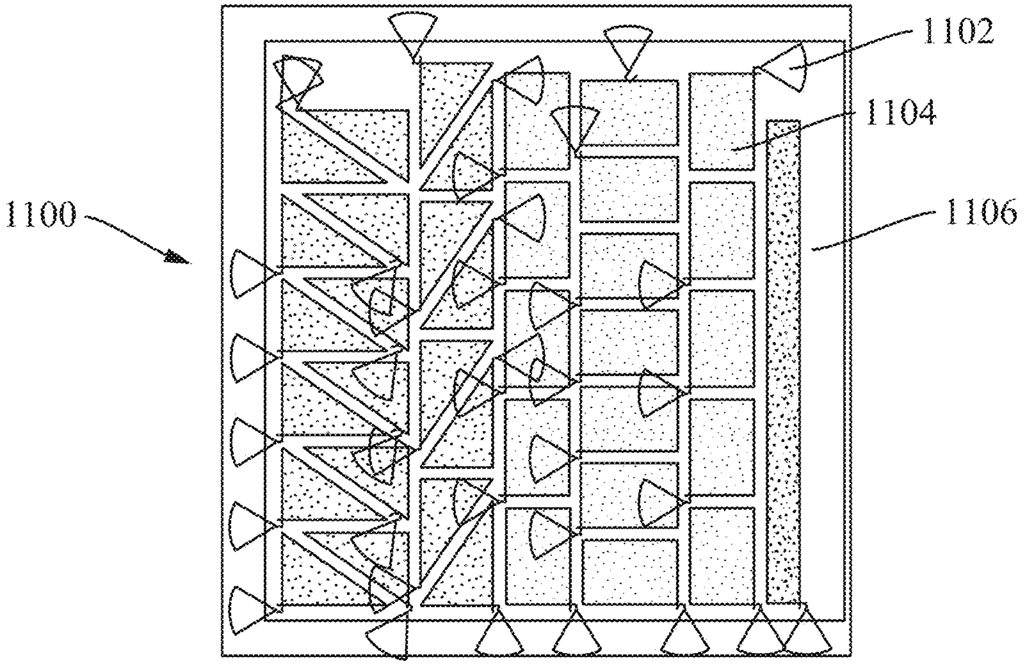
FIG. 11 shows another exemplary display illustrating a set of projected splash zones that can be customized and viewed by an operator of the thermal processing system, according to some embodiments of the present invention.

FIG. 11 shows another exemplary display 1100 illustrating a set of projected splash zones that can be customized and viewed by an operator of the thermal processing system 800, according to some embodiments of the present invention. As shown, the splash zones 1102 are simulated by the SRL module of the nest program 804 for multiple parts 1104 of various shapes and sizes to be cut from a workpiece 1106. The splash zones 1102 can be pie-shaped or assume a different shape as specified by the operator. Thus, the operator can view these estimated splash zones 1102 to understand where the slag puddles are likely to fall on the workpiece 1104 in relation to the nest/layout of the parts 1104 prior to actuating the torch 806 to perform the actual cuts. Based on the displayed splash zones 1102, the SRL module and/or operator can prioritize the parts 1104 to be cut, such as determining a sequence of the multiple parts 1104 to be cut so as to reduce/minimize splash zone impact and influence on final parts and plate utilization, reduce requisite table/torch motion, and/or adjust the nest.

Figure 12:
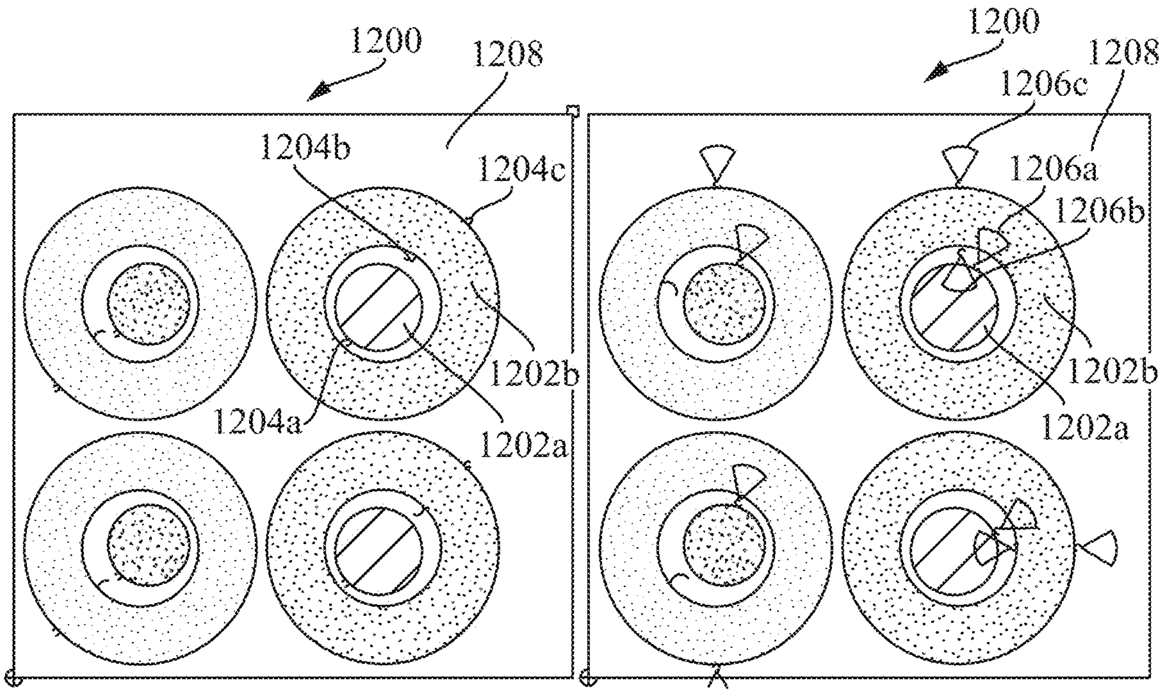
FIG. 12 shows yet another exemplary display illustrating a set of projected splash zones and planned lead-in paths that can be customized, viewed and/or prioritized by an operator of the thermal processing system for cutting multiple parts from a workpiece, according to some embodiments of the present invention.

FIG. 12 shows yet another exemplary display 1200 illustrating a set of projected splash zones 1206 and planned lead-in paths 1204 that can be customized, viewed and/or prioritized by an operator of the thermal processing system 800 for cutting multiple parts 1202 from a workpiece 1208, according to some embodiments of the present invention. As shown, the parts 1202 to be cut are either circular in shape (e.g., part 1202*a*) or toroidal in shape (e.g., part 1202*b*) with each circular part 1202*a* nested inside a toroidal part 1202*b* in an interior profile design for the nest. For such nested structures, the SRL module of the nest program 804 can assign a lead-in path 1204*a* for cutting the circular part 1202*a*, a lead-in path 1204*b* for cutting along the inner circumference of the toroidal part 1202*b*, and a lead-in path 1204*c* for cutting along the outer circumference of the toroidal part 1202*b*. In some embodiments, three splash zones 1206*a-c* are simulated by the SRL module of the nest program 804 for corresponding ones of the three types of lead-in paths 1204*a-c*. In some embodiments, the operator can choose to deactivate the display of the splash zones 1206 and/or the lead-in paths 1204 by selecting the appropriate menu options of the nest program 804.

Figure 13:
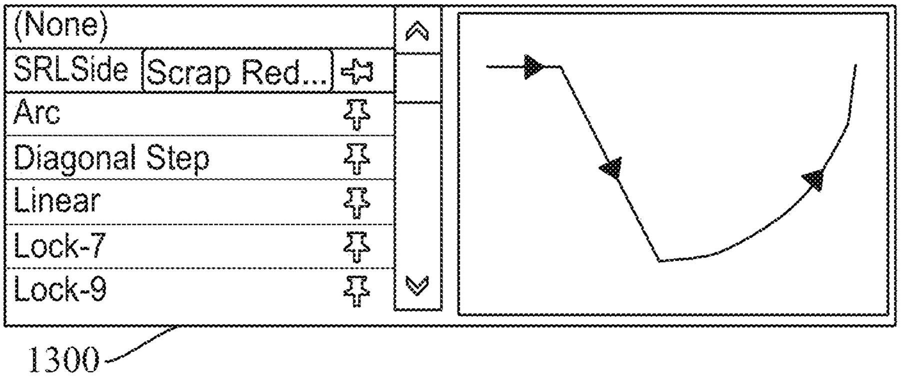
FIG. 13 shows an exemplary pull-down menu of the nest program of FIG. 8 selectable by an operator to specify a corner intersection location for adding a lead-in path relative to a part to be cut, according to some embodiments of the present invention.
Figure 14:
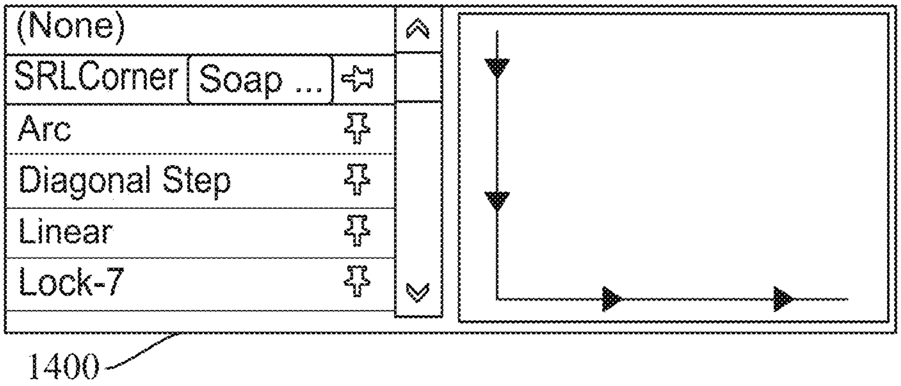
FIG. 14 shows an exemplary pull-down menu of the nest program of FIG. 8 selectable by an operator to specify a side location for adding a lead-in path relative to a part to be cut, according to some embodiments of the present invention.

In some embodiments, the nest program 804 of the control system 800 is configurable by an operator (e.g., via the user interface 810 of the computerized control system 800) to customize the location of a lead-in path relative to a part to be cut. For example, the nest program 804 can include two SRL modules that allow the operator to choose one of the two SRL modules to specify whether a lead-in path for cutting a part is located at the corner of that part or a side of that part between two corners. FIG. 13 shows an exemplary pull-down menu 1300 of the nest program 804 of FIG. 8 selectable by an operator to specify a corner intersection location for adding a lead-in path relative to a part to be cut, according to some embodiments of the present invention. FIG. 14 shows an exemplary pull-down menu 1400 of the nest program 804 of FIG. 8 selectable by an operator to specify a side location for adding a lead-in path relative to a part to be cut, according to some embodiments of the present invention. As shown in FIGS. 13 and 14, the nest program 804 can automatically add in the lead-in path at a corner or side location while taking into consideration of a number of factors including workpiece shape, nest/layout design, and/or material scrap reduction goals. In some embodiments, a corner lead-in is preferred over a side lead-in with the exception of certain circumstances described below with reference to FIG. 15.

Figure 15:
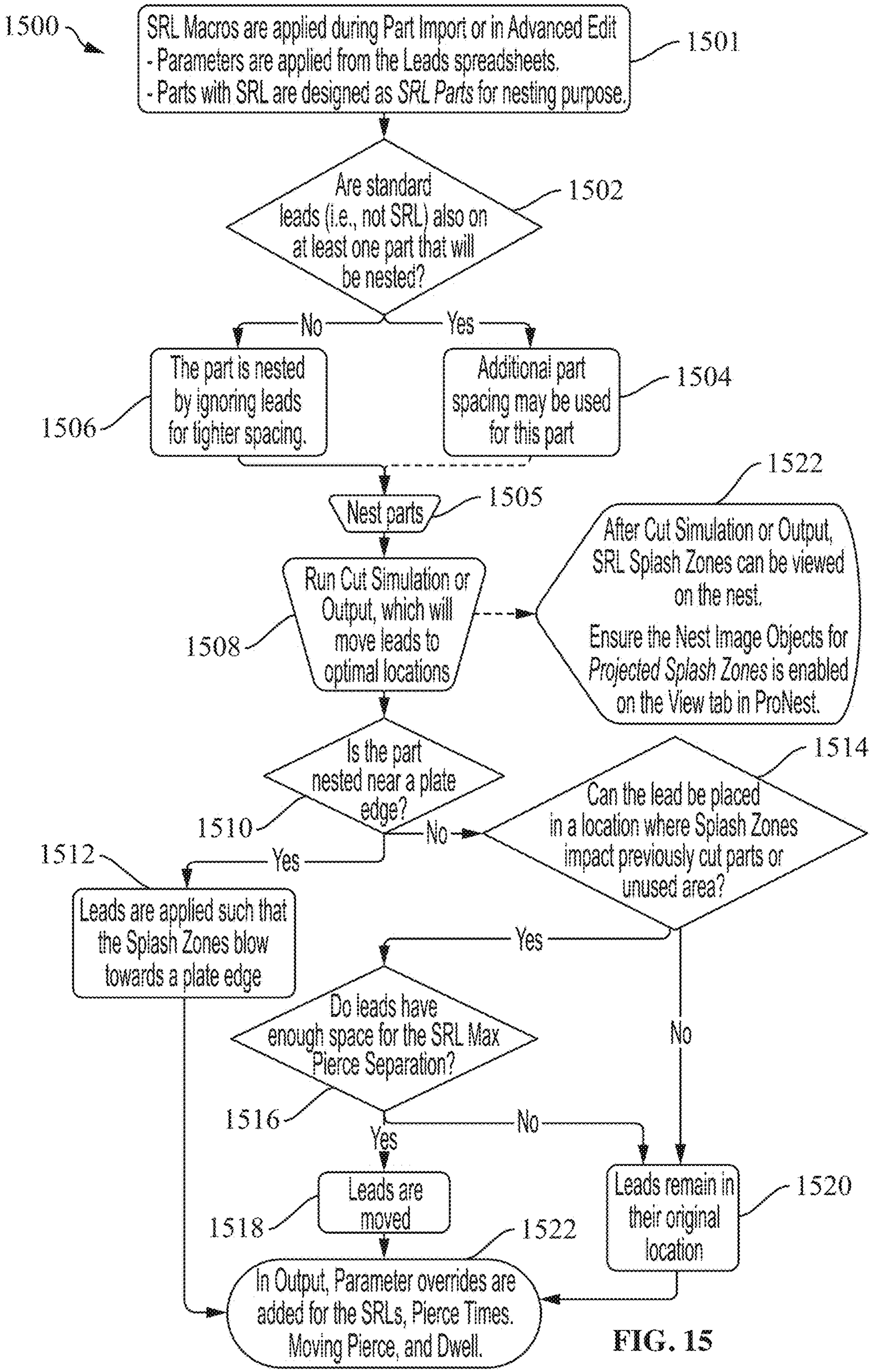
FIG. 15 shows an exemplary process executable by the nest program of the computerized control system of the FIG. 8 for applying the scrap-reduction-lead (SRL) technology in a nesting/layout design, according to some embodiments of the present invention.

FIG. 15 shows an exemplary process 1500 executable by the nest program 804 of the computerized control system 802 of the FIG. 8 for applying the scrap-reduction-lead (SRL) technology in a nesting/layout design, according to some embodiments of the present invention. The process 1500 starts by loading a SRL module into the nest program 804 of the thermal processing system 800 (step 1501). The process 1500 then checks if the SRL module of the nest program 804 will be applied to a nest design and/or is available for use in the nest design (step 1502). If the SRL technology is not utilized in the nest design, the process 1500 proceeds to determine a nesting/layout of one or more desired parts on a workpiece with traditional lead-in designs (step 1504). In this case when no SRL technology is chosen, spacing between any two parts needs to be sufficiently large to accommodate the traditional lead-ins, which means that the spacing is typically much larger than the minimum part spacing requirement. On the other hand, if SRL technology is chosen by an operator, the nest program 804 can design a nest/layout of parts without lead-in avoidance considerations for tighter spacing among the parts (step 1506). In this case, spacing between any two parts only needs to satisfy the minimum part spacing requirement without any consideration toward lead-in overlap avoidance. This is because the lead-ins generated using the SRL technology (including using the double-pierce technique 100 of FIG. 1) are sufficiently short and/or compact (e.g., have effective lengths shorter than the minimum part spacing) that they can be added to the parts without affecting the overall layout.

Once the parts are nested (step 1505), the process 1500 applies the SRL technology to design and automatically add lead-ins to the parts without affecting the existing layout (step 1508). For example, the SRL module can utilize the approaches described above with reference to FIGS. 1-4*b* to determine the optimal locations, shapes, and dimensions of these lead-ins. In some embodiments, the SRL module also determines a sequence of the parts to be cut to avoid slag puddle formation onto future parts to be cut. In some embodiments, splash zones corresponding to the lead-ins of various parts can be estimated and displayed to the operator to allow the operator to adjust one or more parameters of the nest program 804 and/or the lead-ins (step 1522). In addition, after the nesting of parts and the automatic assignment of the lead-ins by the SRL module, the SRL module can further adjust/fine tune one or more of the lead-ins for the parts by using a prioritized series of considerations. More specifically, if the SRL module determines (at step 1510) that a part is located on an edge of the workpiece (e.g., the square part 602*b* of FIG. 6), the SRL module can ensure that the lead-in for that part is suitably configured to direct the resulting slag puddle to fall off of the workpiece (step 1512), such as toward an edge of the workpiece. If the part is an interior part that is not close to an edge of the workpiece (e.g., the square part 602*a* of FIG. 6), the SRL module can ensure that the lead-in for the part is suitably configured to direct the resulting slag puddle to impact one or more previously cut parts or unused area(s) (step 1514). For example, priority can be given to placing a lead-in that directs the resulting slag puddle to fall onto a void/skeleton of a remnant of unused area of the workpiece, followed by a lead-in that directs the resulting slag puddle to fall on a previously cut part. If those options are not possible, the lead-in can be located to direct the slag puddle to fall onto a future part. In some embodiments, the process 1500 prioritizes lead-in placement at a part corner (e.g., beginning the actual cut of the desired part at a corner of the desired part). However, if this placement requires the resultant slag puddle to fall onto a future part, the process 1500 can place the lead-in along a side of the part (e.g., beginning the actual cut of the desired part mid-segment/between two corners of the desired part) if this situation can be avoided.

In some embodiments, the process 1500 further checks if an adjusted lead-in (determined from step 1514) has enough space to satisfy a minimal optimal spacing requirement as explained above with respect to FIG. 9 (step 1516). For example, the SRL module may require each start pierce location of a lead-in for a part to be about equidistant to that part and the adjacent part(s). If the minimal optimal spacing requirement can be satisfied for the adjusted lead-in design, the lead-in is relocated to the more optimal location determined by the SRL technology at step 1514 (step 1518). Otherwise, the lead-in remains at the original location determined at step 1508 (step 1520). In some embodiments, torch heights are also checked to ensure compliance with the nest and lead-in placements. In some embodiments, modifications and/or additions (e.g., locations) can be made by an operator to tailor the settings of the SRL module for specific outcomes and provide inputs for the final nest design (step 1522).

Figure 16A:
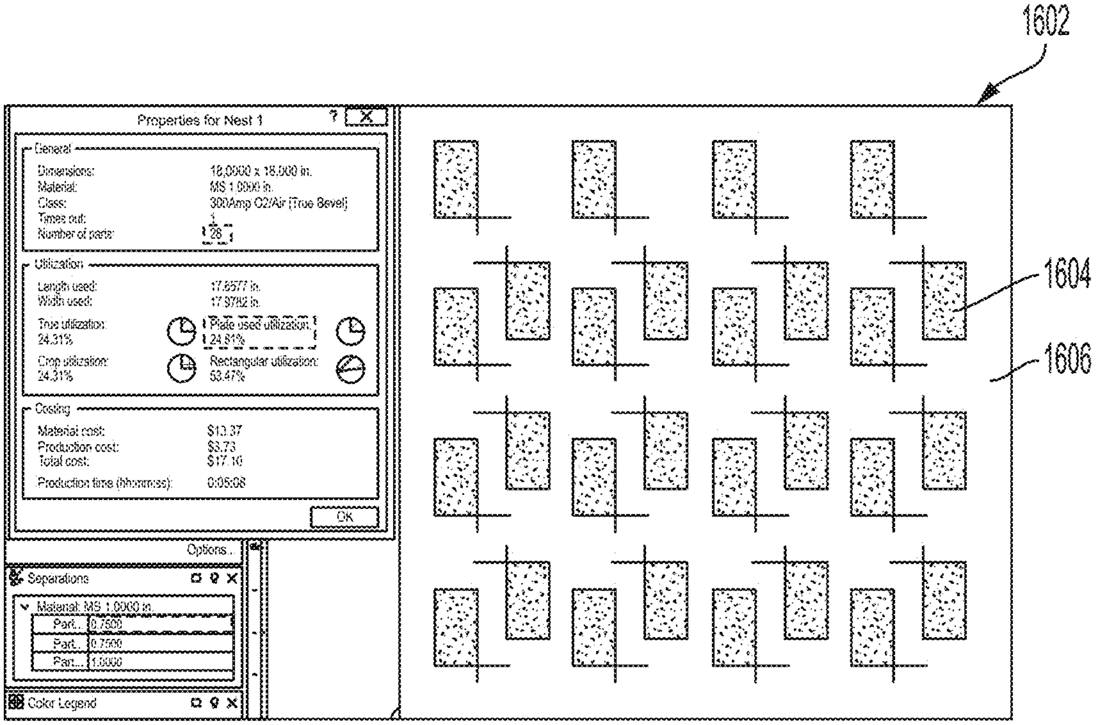
FIG. 16*a* and 16*b* illustrate workpiece utilizations by (i) a nest/layout of parts with standard lead-ins and (ii) a nest/layout of parts of the same dimension with lead-ins designed using the nest program of FIG. 8, respectively, according to some embodiments of the present invention.
Figure 16B:
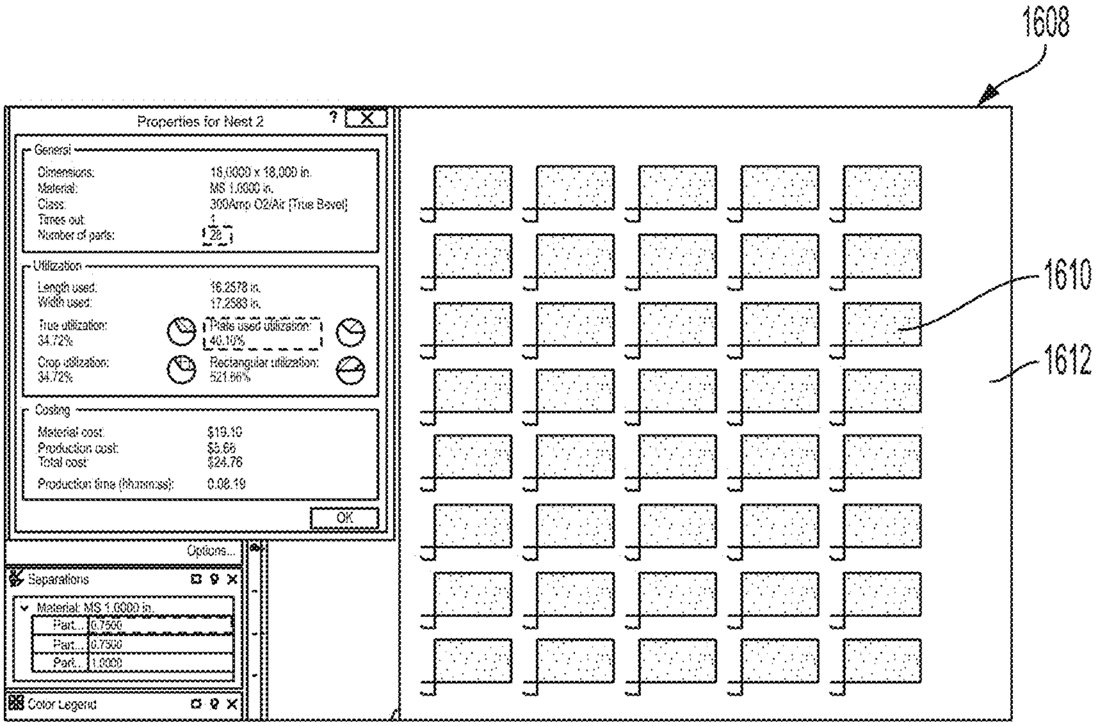

In general, embodiments of the present invention increase workpiece utilization by reducing scrap generation. FIG. 16*a* and 16*b* illustrate workpiece utilizations by (i) a nest/layout of parts with standard lead-ins and (ii) a nest/layout of parts of the same dimension with lead-ins designed using the nest program 804 of FIG. 8, respectively, according to some embodiments of the present invention. As describe above, the nest program 804 is configured to employ the SRL technology. FIG. 16*a* shows an exemplary layout 1602 of rectangular parts 1604 with standard lead-in styles on an 18 inch×18 inch workpiece 1606. As shown, 18 rectangular parts 1604 can fit on the workpiece 1606 to accommodate the standard lead-ins, which is associated with a utilization effectiveness of about 24.81%. FIG. 16*b* shows an exemplary layout 1608 of parts 1610 with the same shape and dimension as the parts 1604 of FIG. 16*a* on a workpiece 1612 of the same shape, dimension and material properties as the workpiece 1606 of FIG. 16*a*. Applying the SRL technology, the nest program 804 is able to fit 40 parts on the workpiece, which corresponds to an improved utilization effectiveness of about 40.10%. When comparing the layouts 1602, 1608 of FIG. 16*a* and 16*b*, the SRL technology employed by the nest program 804 of the present invention is able to suggest a different layout 1608 in comparison to the layout 1602 generated using traditional lead-ins. The improved layout 1608 reduces spacing between parts that results in improved parts and workpiece utilization. This in turn results in a significant savings for an end user.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A computerized method for controlling cutting of a plurality of parts from by a thermal processing torch, the computerized method comprising:

receiving, by a computing device, information related to the plurality of parts to be cut from the workpiece by the thermal processing torch;

generating, by the computing device, a layout of the plurality of parts to be cut based on the information;

generating, by the computing device, a cutting plan that comprises both (i) determining a sequence of the plurality of parts to be cut and (ii) selecting directions of pierce slag puddle formations on the workpiece for corresponding ones of the plurality of parts, such that for each part the selected direction is adapted to direct the pierce slag puddle formation for cutting that part toward an edge of the workpiece so that the pierce slag puddle falls off the workpiece if the part is located along the edge, onto a processing path of another part that is earlier in the sequence of the plurality of parts to be cut, or onto an unused area of the workpiece; and causing, by the computing device, the thermal processing torch to sequentially cut the plurality of parts from the workpiece in accordance with the cutting plan.

2. The computerized method of claim 1, wherein generating the cutting plan further comprises determining, for at least one part, a cutting path that directs the corresponding pierce slag puddle formation away from one or more of (i) the at least one part or (ii) a cutting path of a subsequent part.

3. The computerized method of claim 2, wherein the cutting path for the at least one part that directs the corresponding pierce slag puddle formation away comprises (i) an initial pierce segment, (ii) a bridge segment, (iii) a lead-in segment and (iv) a full cutting path that cuts a geometry of the at least one part from the workpiece.

4. The computerized method of claim 3, wherein the initial pierce segment comprises a trench gouged into the workpiece along a first direction, wherein the trench is generated by an initial piercing operation without penetrating an entire thickness of the workpiece.

5. The computerized method of claim 4, wherein the bridge segment corresponds to a second direction collinear with the first direction.

6. The computerized method of claim 5, wherein the lead-in segment corresponds to a third direction different from the first and second directions, the lead-in segment being generated by the thermal processing torch at a current setting that is about 50% higher than a current setting associated with generating the initial pierce segment.

7. The computerized method of claim 4, wherein the trench in the workpiece is configured to guide the slag puddle formation generated during cutting of the at least one part along the full cutting path.

8. The computerized method of claim 3, wherein a starting location of the initial pierce segment for the at least one part maintains a minimal separation distance from two adjacent parts of the at least one part.

9. The computerized method of claim 8, wherein the minimal separation distance between the starting location of the initial pierce segment for the at least one part and each of the two adjacent parts is about 60% of a thickness of the workpiece.

10. The computerized method of claim 3, wherein a predicted distance between a center of mass of the slag puddle formation to a starting location of the bridge segment is about 1 to 2 times a thickness of the workpiece.

11. The computerized method of claim 1, further comprising visually displaying the selected directions of pierce slag puddle formations as splash zones on the workpiece for the plurality of parts.

12. The computerized method of claim 11, wherein each splash zone is visualized as a cone of about 60 degrees centered relative to the corresponding selected direction of pierce slag puddle formation.

13. The computerized method of claim 1, wherein the selection of the direction of pierce slag puddle formation for a part is performed prior to cutting the part and is continuously updated during cutting.

14. The computerized method of claim 1, wherein the layout of the plurality of parts comprises a staggered arrangement of the plurality of parts such that a predicted center mass of a slag puddle formation corresponding to at least one part of the plurality of parts is projected to be located between two parts adjacent to the at least one part.

* * * * *